(12) United States Patent
Johnson et al.

(10) Patent No.: US 9,469,057 B2
(45) Date of Patent: Oct. 18, 2016

(54) SUPPORT STRUCTURES AND DEPOSITION TECHNIQUES FOR 3D PRINTING

(71) Applicant: 3D Systems, Inc., Rock Hill, SC (US)

(72) Inventors: Martin Alan Johnson, Rock Hill, SC (US); Chris Roberts Manners, Moorpark, CA (US); Andrew Edwards, North Somerset (GB)

(73) Assignee: 3D Systems, Inc., Rock Hill, SC (US)

( * ) Notice: Subject to any disclaimer, the term of this patent is extended or adjusted under 35 U.S.C. 154(b) by 534 days.

(21) Appl. No.: 13/896,849

(22) Filed: May 17, 2013

(65) Prior Publication Data
US 2013/0307193 A1    Nov. 21, 2013

Related U.S. Application Data

(60) Provisional application No. 61/649,176, filed on May 18, 2012.

(51) Int. Cl.
*B29C 67/00* (2006.01)
*B29C 37/00* (2006.01)
*C09J 129/04* (2006.01)
(Continued)

(52) U.S. Cl.
CPC ....... *B29C 37/0003* (2013.01); *B29C 67/0055* (2013.01); *B29C 67/0085* (2013.01); *B29C 67/0092* (2013.01); *C08G 73/0233* (2013.01); *C09J 129/04* (2013.01); *C09J 129/10* (2013.01); *C09J 133/08* (2013.01); *C09J 177/00* (2013.01); *C09J 179/00* (2013.01); *C09J 179/02* (2013.01);
(Continued)

(58) Field of Classification Search
CPC .......... B29C 67/0055; B29C 67/0059; B29C 67/0092; C09J 129/04; C09J 177/00
USPC ........................................................ 264/401
See application file for complete search history.

(56) References Cited

U.S. PATENT DOCUMENTS

| 4,436,867 A | 3/1984 | Pomplum et al. |
| 4,749,347 A | 6/1988 | Valavaara |

(Continued)

FOREIGN PATENT DOCUMENTS

| EP | 94116244.8 | 5/1995 |
| EP | 03075228.1 | 7/2003 |

(Continued)

OTHER PUBLICATIONS

PCT International Search Report for International Application No. PCT/US2013/041633, dated Jul. 26, 2013 (4 pages).

(Continued)

*Primary Examiner* — Alison L Hindenlang
*Assistant Examiner* — Mohamed K Ahmed Ali

(57) ABSTRACT

There is provided a support structure for use with 3D printing of objects from computer-aided designs. The support structures include fine points that contact the down-facing surfaces of the 3D object being printed in order to adequately support the 3D object while also being adapted for easy removal after the 3D print process is complete. The fine points are possible by controlling the operation of the dispenser to provide a precise amount of material in a precise location. The dispenser jumps from a first fine point to a second fine point by retracting the print material after the first fine point is printed and then moving the dispenser vertically relative to the first fine point before the dispenser is moved horizontally to the second fine point.

20 Claims, 26 Drawing Sheets

(51) Int. Cl.
*C08G 73/02* (2006.01)
*C09J 179/02* (2006.01)
*C09J 177/00* (2006.01)
*C09J 129/10* (2006.01)
*C09J 133/08* (2006.01)
*C09J 179/00* (2006.01)
*B29K 29/00* (2006.01)
*B29K 33/04* (2006.01)

(52) U.S. Cl.
CPC ........ *B29K 2029/04* (2013.01); *B29K 2033/04* (2013.01)

(56) References Cited

U.S. PATENT DOCUMENTS

| | | | |
|---|---|---|---|
| 5,121,329 A | | 6/1992 | Crump |
| 5,503,785 A | * | 4/1996 | Crump ................ B29C 67/0092 264/308 |
| 5,939,008 A | | 8/1999 | Comb et al. |
| 6,193,923 B1 | | 2/2001 | Leyden et al. |
| 6,217,432 B1 | | 4/2001 | Woo |
| 6,558,606 B1 | | 5/2003 | Kulkarni et al. |
| 6,824,639 B1 | * | 11/2004 | Hill ...................... B44C 1/1716 156/230 |
| 7,958,841 B2 | | 6/2011 | Krichman et al. |
| 8,287,794 B2 | | 10/2012 | Pax et al. |
| 8,425,218 B2 | | 4/2013 | Pettis |
| 2002/0111707 A1 | | 8/2002 | Li et al. |
| 2007/0257055 A1 | * | 11/2007 | Scott ................... B29C 67/0055 222/71 |
| 2008/0118655 A1 | * | 5/2008 | Kritchman .............. B29C 41/02 427/427.3 |
| 2008/0233302 A1 | * | 9/2008 | Elsner ................ B29C 67/0059 427/421.1 |
| 2011/0060445 A1 | | 3/2011 | Heenan |

FOREIGN PATENT DOCUMENTS

| | | |
|---|---|---|
| WO | 99/60508 | 11/1999 |
| WO | 2004/045834 | 6/2004 |

OTHER PUBLICATIONS

PCT Written Opinion of the International Search Authority for International Application No. PCT/US2013/041633, dated Jul. 26, 2013 (5 pages).
PCT International Preliminary Report for International Application No. PCT/US2013/041633, dated Nov. 27, 2014 (2 pages).
PCT Written Opinion for International Application No. PCT/US2013/041633, dated Nov. 27, 2014 (5 pages).
PCT International Search Report for International Application No. PCT/US2013/041620, dated Sep. 5, 2013 (5 pages).
PCT written Opinion of the International Search Authority for International Application No. PCT/2013/041620, dated Sep. 5, 2013 (6 pages).

* cited by examiner

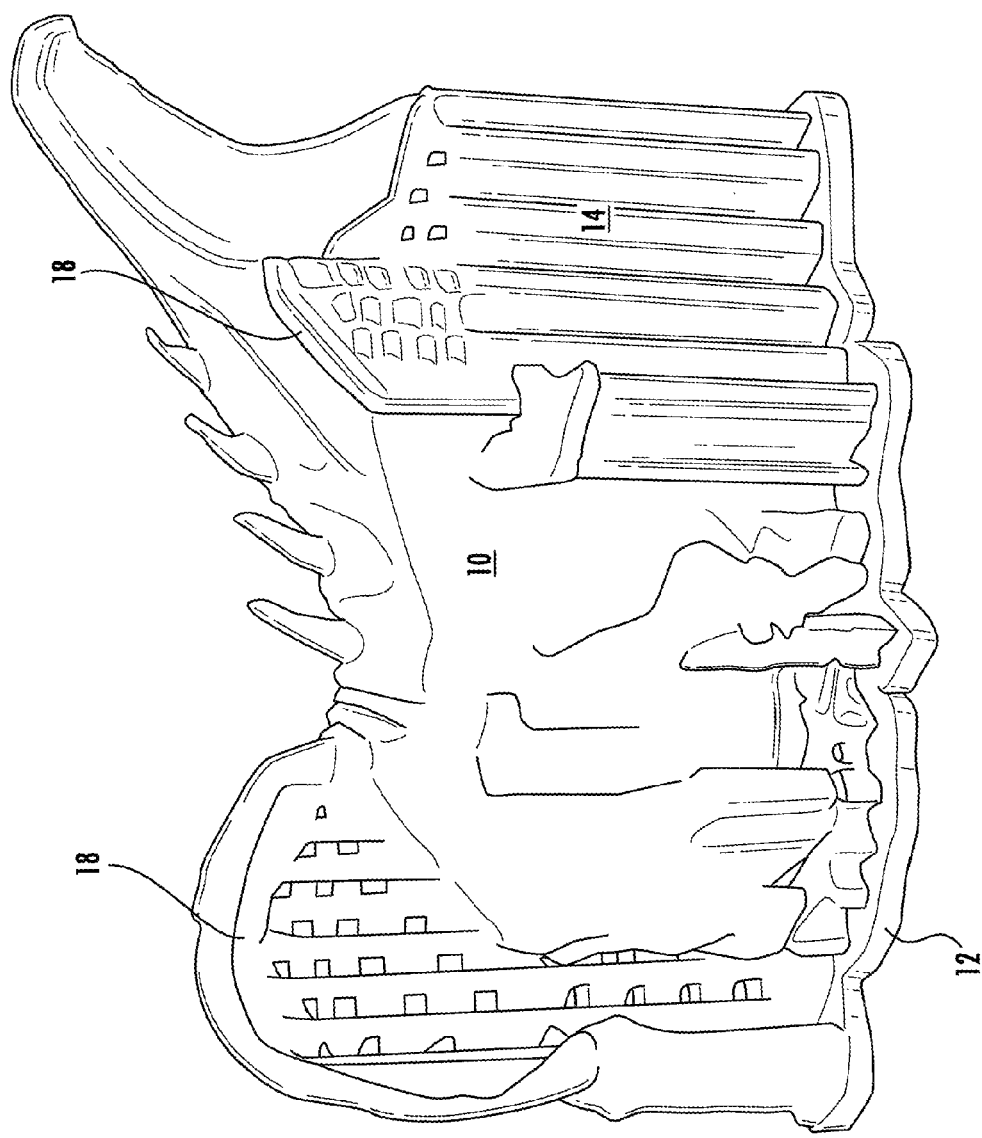

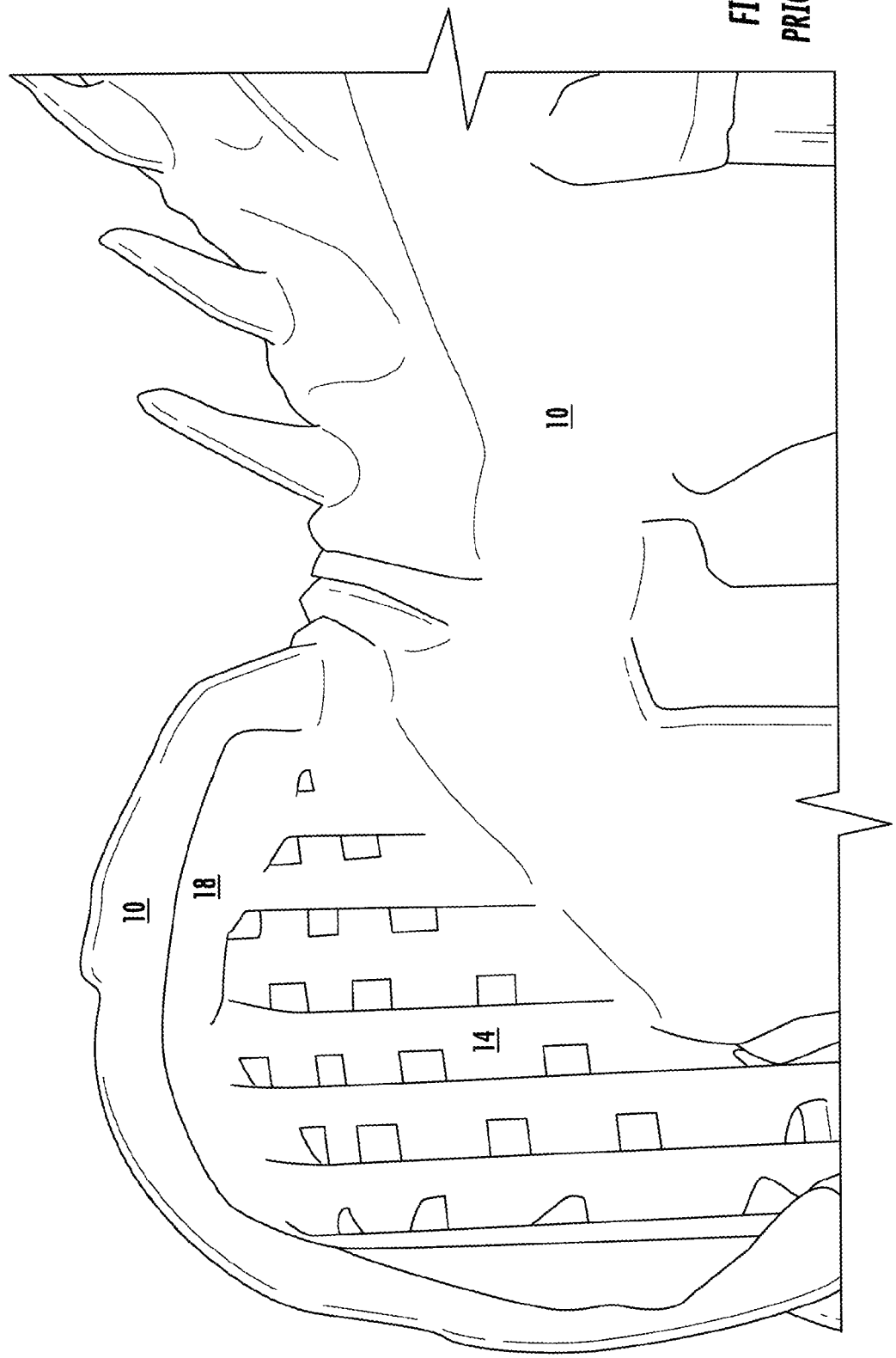

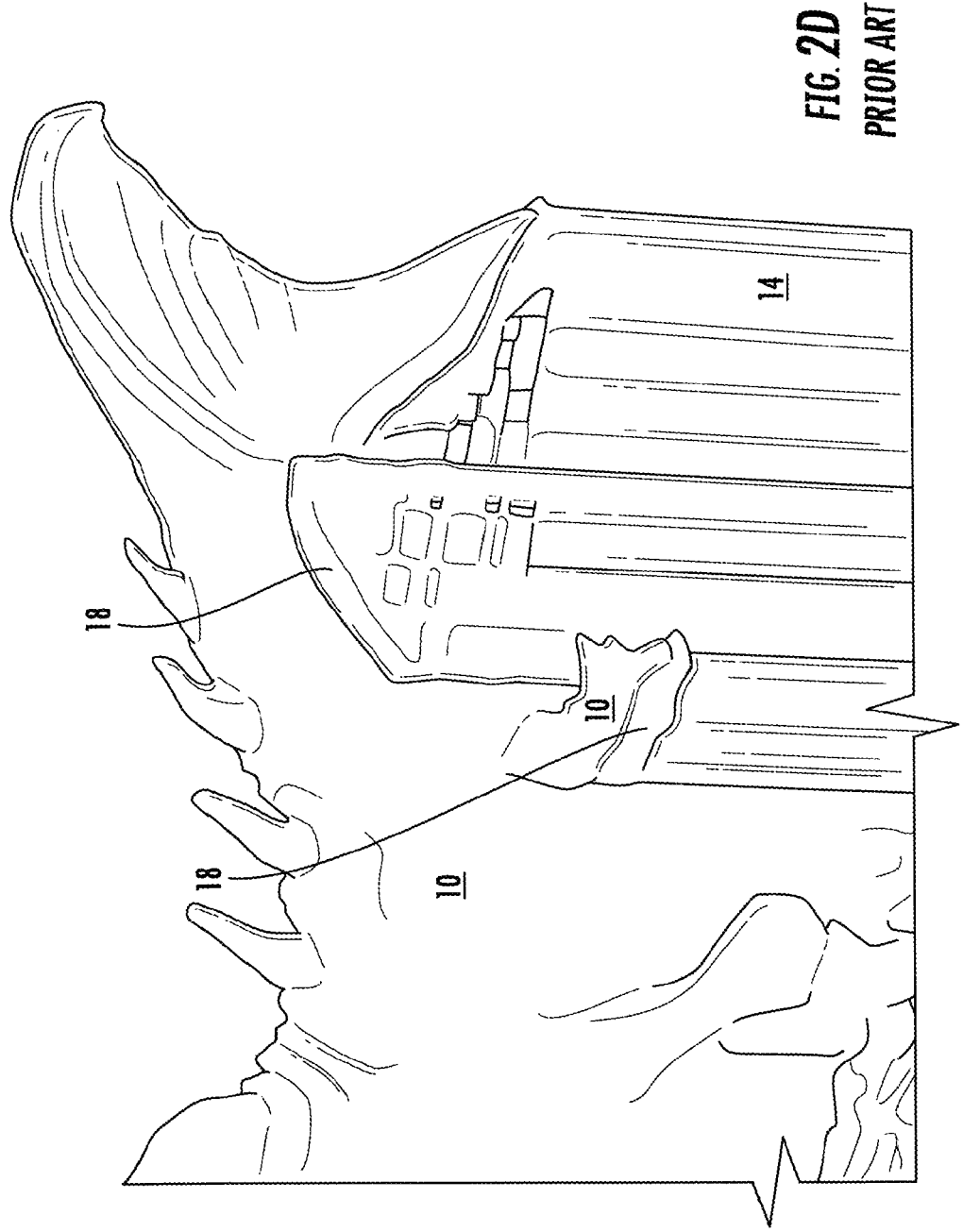

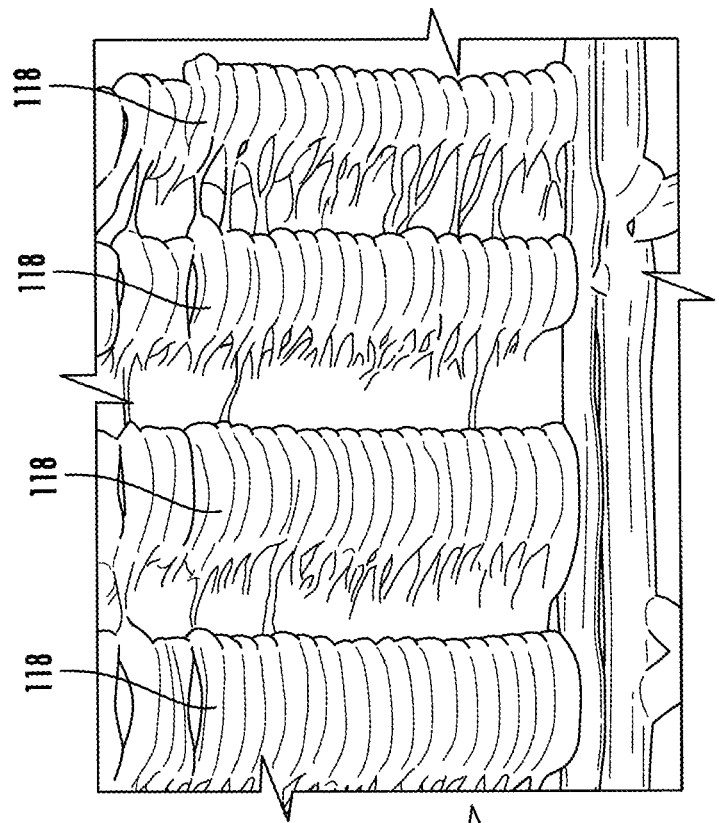
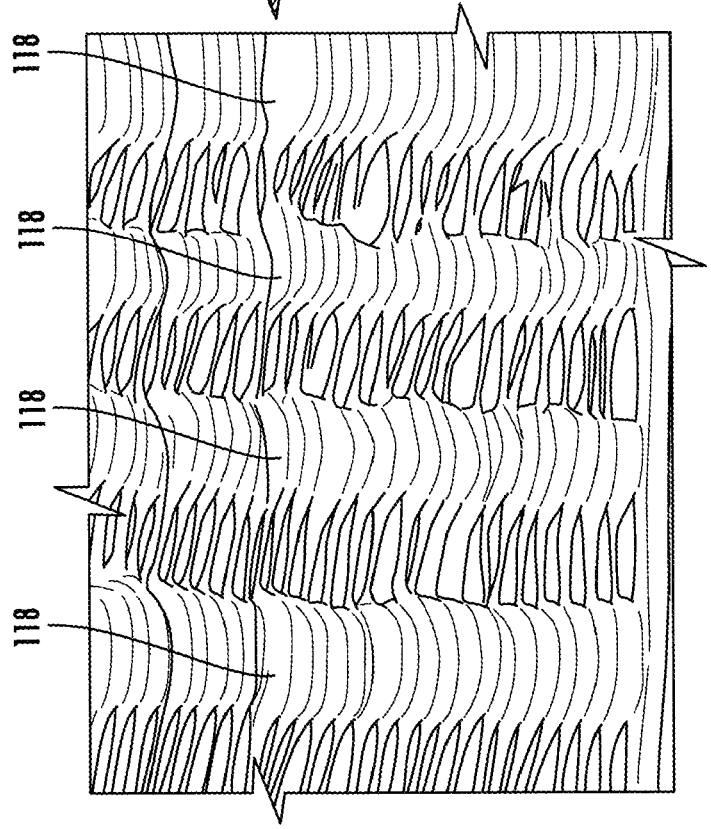
FIG. 10A
FIG. 10B

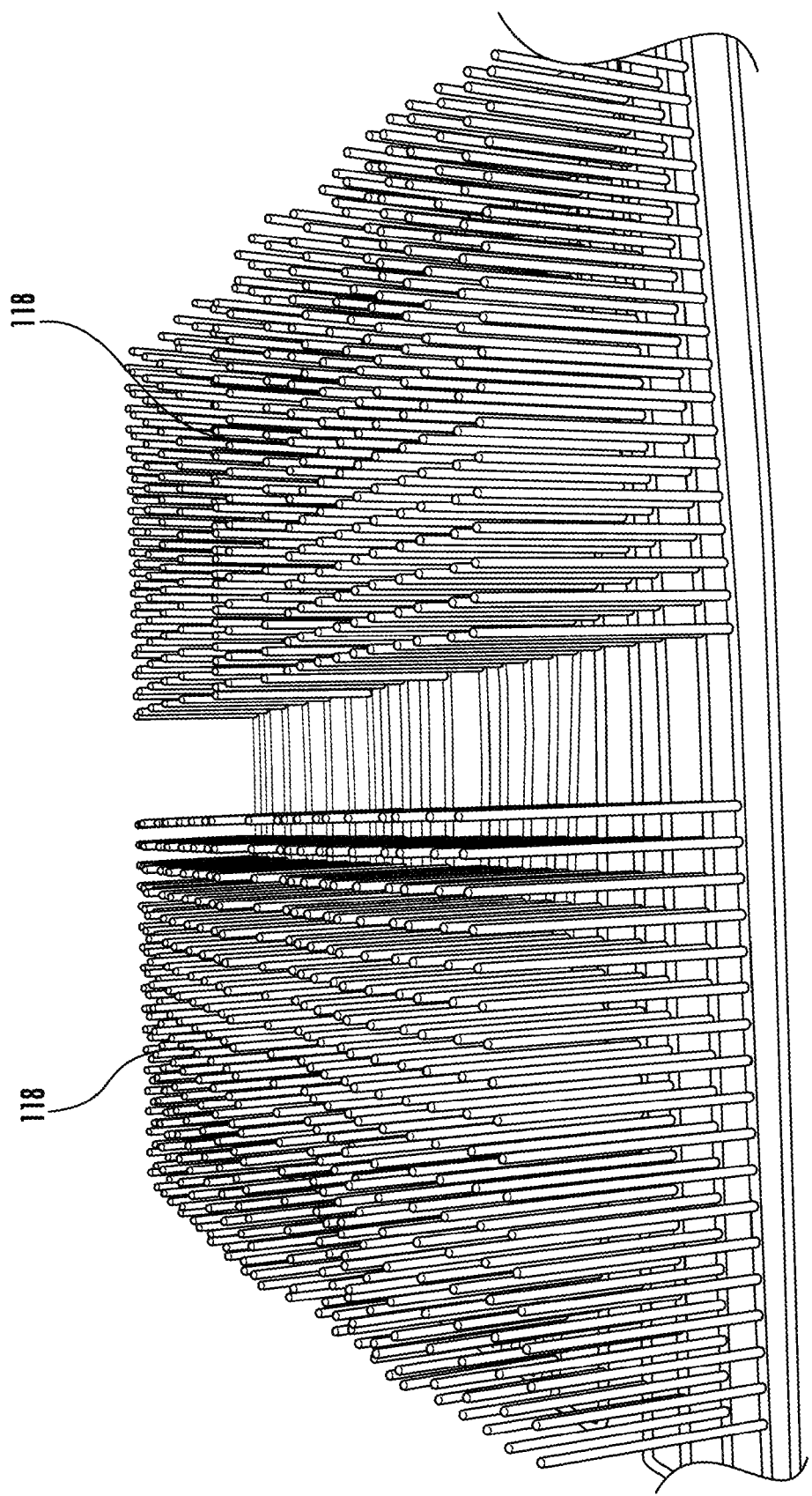

US 9,469,057 B2

SUPPORT STRUCTURES AND DEPOSITION TECHNIQUES FOR 3D PRINTING

FIELD OF THE INVENTION

The present invention is related to additive manufacturing, and more particularly, to methods and compositions for supporting and printing objects during the printing of three dimensional (3D) objects.

BACKGROUND OF THE INVENTION

Additive and subtractive manufacturing technologies enable computer designs, such as CAD files, to be made into 3D objects. 3D printing, also known as additive manufacturing, typically comprises depositing, curing, fusing, or otherwise forming a material into sequential cross-sectional layers of the 3D object. For example, fused deposition modeling techniques, which are generally disclosed in U.S. Pat. No. 4,749,347 and U.S. Pat. No. 5,121,329, among others, which are incorporated by reference herein in their entirety, include melting a filament of build material and extruding the print material out of a dispenser that is moved in the x-, y-, and z-axes relative to a print pad. The print material is generally deposited in layers in the x- and y-axes to form cross-sectional layers that are stacked along the z-axis to form the 3D object.

3D objects that do not have a planar down-facing surface typically must be supported in some or all areas below the 3D objects. In addition, some additive manufacturing techniques cannot print a 3D object directly onto the print pad because such direct contact between the printed object and the print pad can cause surface flaws on the contacting surface of the printed object or may cause difficulty in the separation of the printed object from the print pad.

Certain 3D printing technologies overcome these problems by printing a support structure between the printed 3D object and the print pad. With regards to fused deposition modeling, one technique is using two separate print materials. A first print material, sometimes called a build material, is used to print the printed 3D object and the second print material, sometimes called a support material, is used to support the printed 3D object. Once a print process is complete, the printed 3D object may be mechanically removed from the support structure because of the lack of bonding at the interface between the build material and the support material, the support material may be heated and melted away from the printed 3D object, or the support material may be dissolved away from the printed 3D object. A second technique used with fused deposition modeling to support the printed object, that is most often used with systems that dispense only a singled print material, is to print a support structure under the printed 3D object and then mechanically remove the support structure after the print operation is complete. The upper portion of the support structure that contacts the down-facing surface of the printed 3D object is typically a long bead of material deposited from the dispenser, which may be difficult to remove without scarring or otherwise impairing the quality of the down-facing surface. Therefore, a need exists to provide support structures that adequately support the printed 3D object and that are easy to remove without damaging the printed object.

Therefore, a need exists to improve the printing of 3D objects to provide accurate parts, models, and other 3D objects that are adequately supported during the print process by supports that may be easily removed.

BRIEF SUMMARY OF THE INVENTION

The various embodiments of the present invention address the above needs and achieve other advantages by providing novel support structures for extruded print materials and by providing an adhesive that provides satisfactory bonding of the extruded print material to the print pad during the print process yet enables the printed material to be easily separated from the print pad after the print process. These embodiments may be used individually or may be used together to allow printing of accurate 3D objects with improved down-facing surfaces that are easily separated from the support structures. These embodiments are particularly advantageous with 3D printing techniques that use the same print material to print the 3D object and the support structure; however, the embodiments may also be used with 3D printing techniques that use different materials to print the 3D object and the support structure.

Turning first to the embodiments of the invention relating to the novel support structures, the invention comprises techniques for moving a dispenser that extrudes a printed material in a manner that enables the printing of discrete features, referred to herein as "fine points," that are relatively small yet relatively accurate in order to provide a support structure that contacts the down-facing surfaces of the printed 3D object with points rather than continuous beads. By controlling the movement of the dispenser along the x-, y-, and z-axis relative to the print pad, the present invention is able to print small features with no or minimal excess material that would reduce the accuracy or strength of the printed material. In one embodiment of the present invention, one or more layers of the support structure proximate the down-facing surface of the object comprises the fine points. The fine points are made by jumping the dispenser between fine points to minimize or eliminate unintentional dispensing of material between fine points. Such unintentionally dispensed material can impair the accuracy of the fine points and cause them to inadequately support the 3D object, resulting in flaws on the down-facing surfaces of the 3D object or lead to other defects within or on the 3D object.

In some embodiments of the preset invention, the dispenser jumps between fine points by first dispensing material to print a first fine point. Once the fine point has been printed, the dispenser retracts the print material from the exit of the dispenser. The dispenser is then moved vertically relative to the first fine point, by moving the dispenser and/or the print pad, and then moved horizontally relative to the first fine point. By retracting, moving vertically, and then moving horizontally, the jump causes strings or blobs of excess material to be minimal or non-existent, thus enabling accurate printing of the fine points, which has not been possible by prior art techniques. In some embodiments, the dispenser is first moved in a direction that is not in the direction of the second fine point so that any string or blob of unintentional material does not accumulate with other strings or blobs that would cause the fine point to shift position. Certain embodiments move the dispenser in a first motion that is the direction opposite the direction of the second fine point to generally cause a string or blob to fall back upon the first fine point, which can be covered by subsequent layers of material. Still other embodiments move the dispenser in a first motion that is randomized or different for each layer so that the unintentionally dispensed material does not accumulate on one side to minimize the negative affect of such unintentionally dispensed material.

The methods of the present invention enable a single print material 3D printer to make a support structure that has accurate fine points that reliably support printed 3D objects and that are easily removed from the 3D object with minimal surface flaws to the surfaces of the 3D objects that contact the fine points. In some embodiments of the present invention, the fine points are very small, such as on the order of the size of the dispenser exit. In some embodiments the fine points have a horizontal cross-sectional size of about 1 mm in diameter or may define sizes such as 0.4 mm to 1.0 mm in the direction of movement of the dispenser and 1 to 2 mm in an orthogonal direction. Because strings and blobs are minimized, the distances of jumps can be reduced and can be on the order of 1 mm to 5 mm long, such as 2 mm long. Because of the improved accuracy of the fine points, the fine points can be relatively tall in a vertical direction, which enables the supports to be more easily removed, and consume less print material, than conventional support structure techniques.

Turning now to the embodiments of the invention relating to the novel adhesive, an "adhesive," in some embodiments, comprises a material that is operable to bond a print material to a print pad, including one or more print materials or print pads described herein. Moreover, in some embodiments, an adhesive is operable to selectively bond or release a print material to a print pad. For example, in some embodiments, the adhesive properties of an adhesive described herein are temperature-dependent. In some embodiments, the adhesive properties are water-sensitive.

In some embodiments, an adhesive described herein comprises a first polymeric component comprising a polyvinyl alcohol) (hereinafter "PVOH") and a second polymeric component. In some embodiments, an adhesive further comprises one or more of a solvent, a surfactant, and a preservative. Alternatively, in other embodiments, the first polymeric component of an adhesive described herein does not necessarily comprise a PVOH.

The embodiments of the present invention provide for improved building of 3D objects by strengthening the support structure provided for the 3D object during printing, and by enabling the support structure to be more easily removed from the 3D object after printing.

BRIEF DESCRIPTION OF THE SEVERAL VIEWS OF THE DRAWINGS

Figure 1:
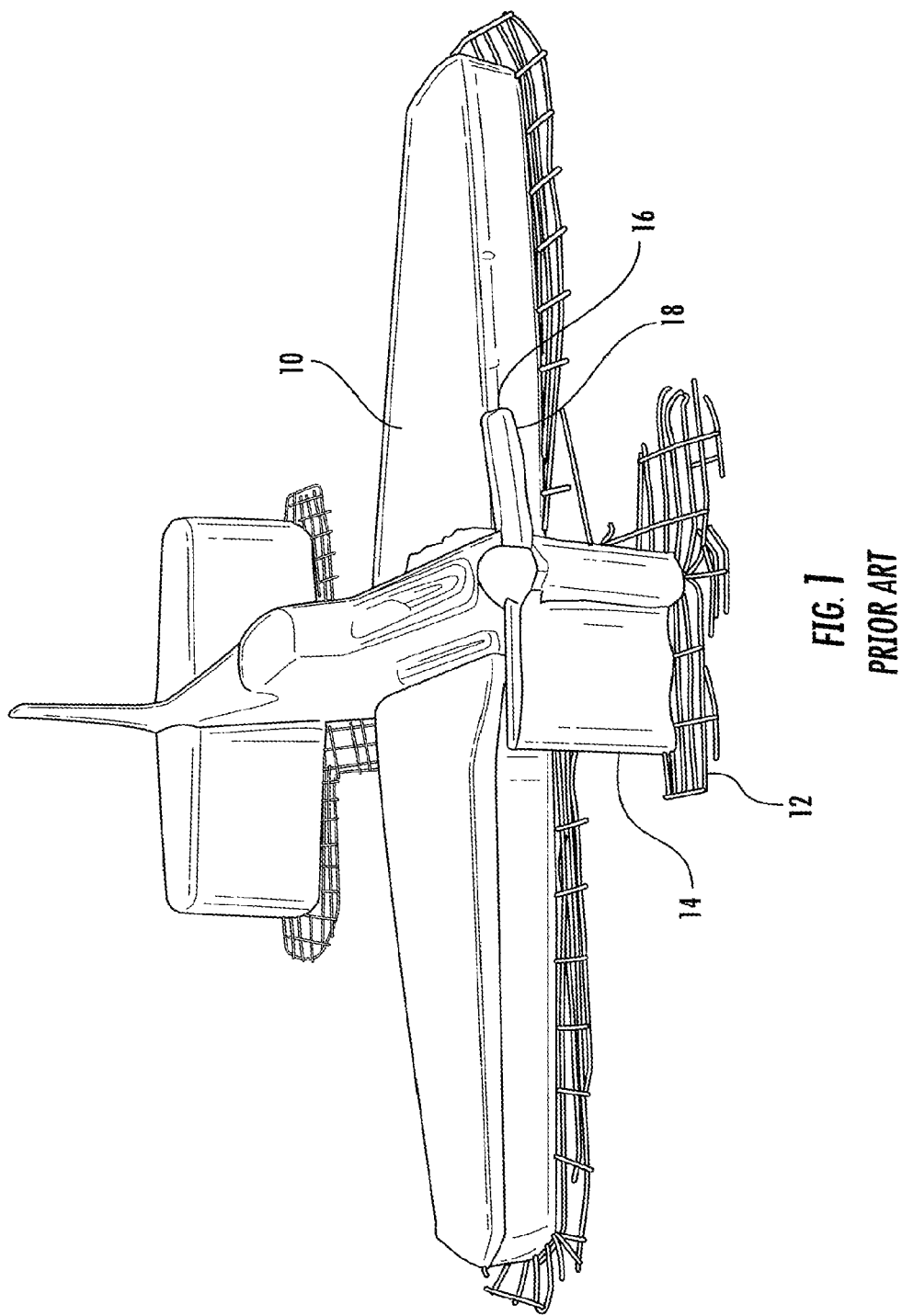
Figure 2C:
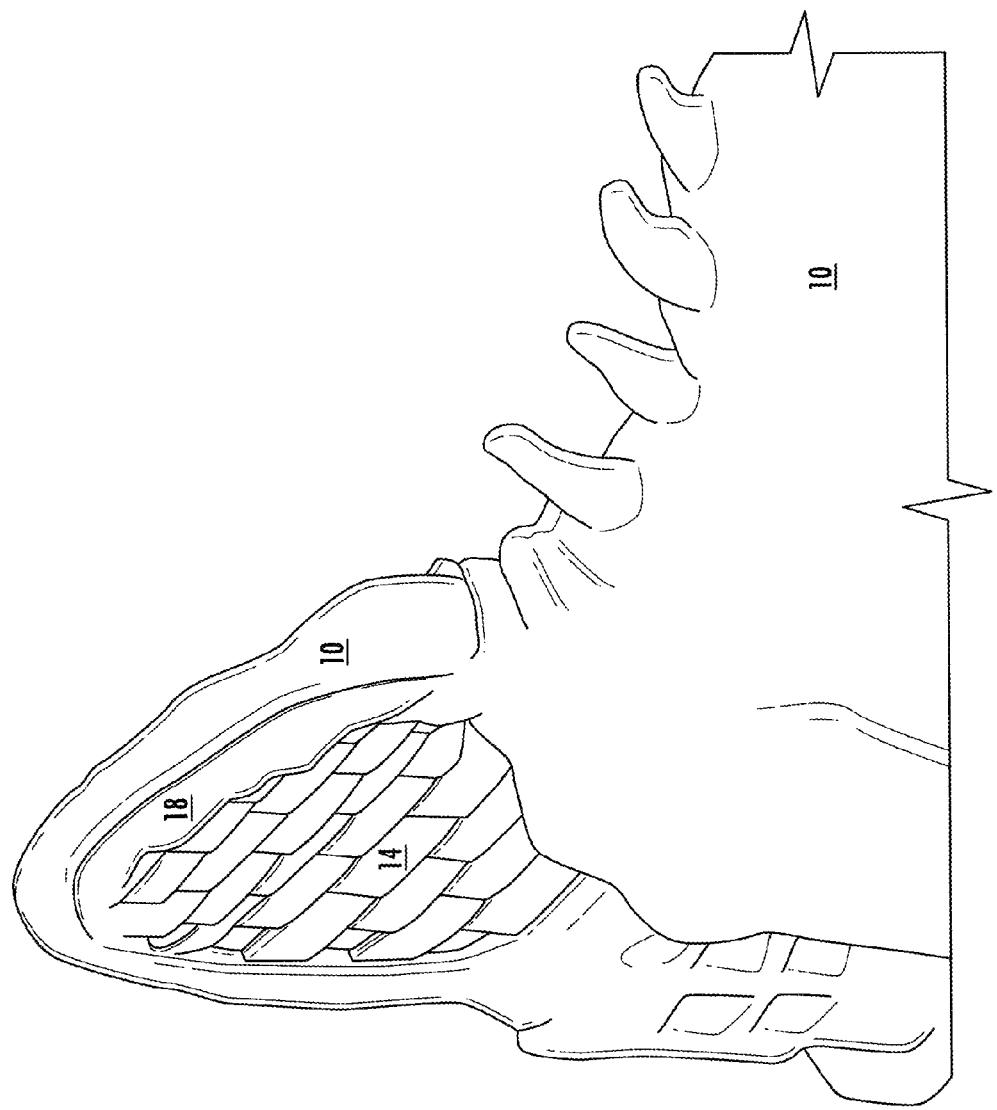
Figure 3A:
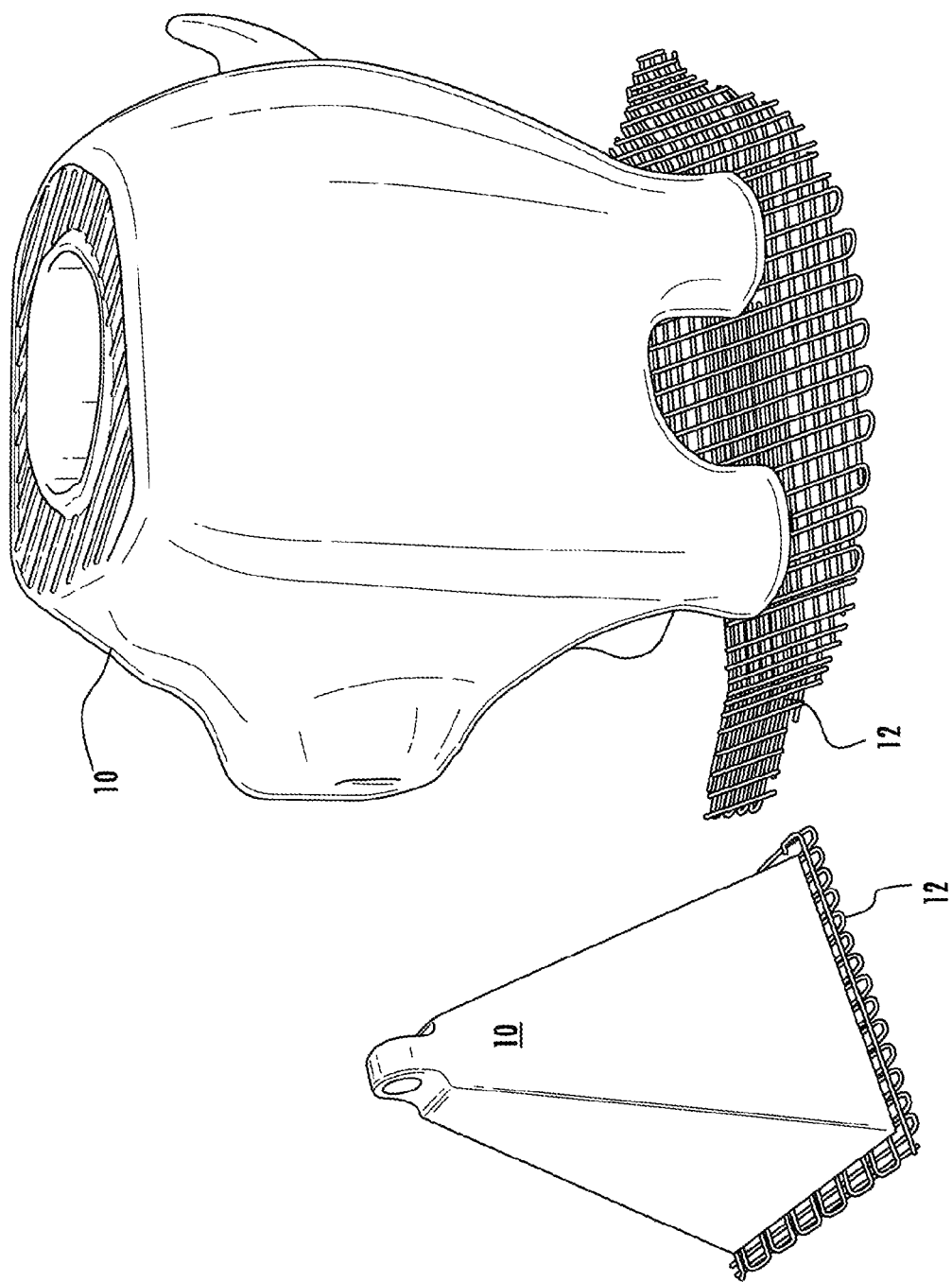
Figure 3B:
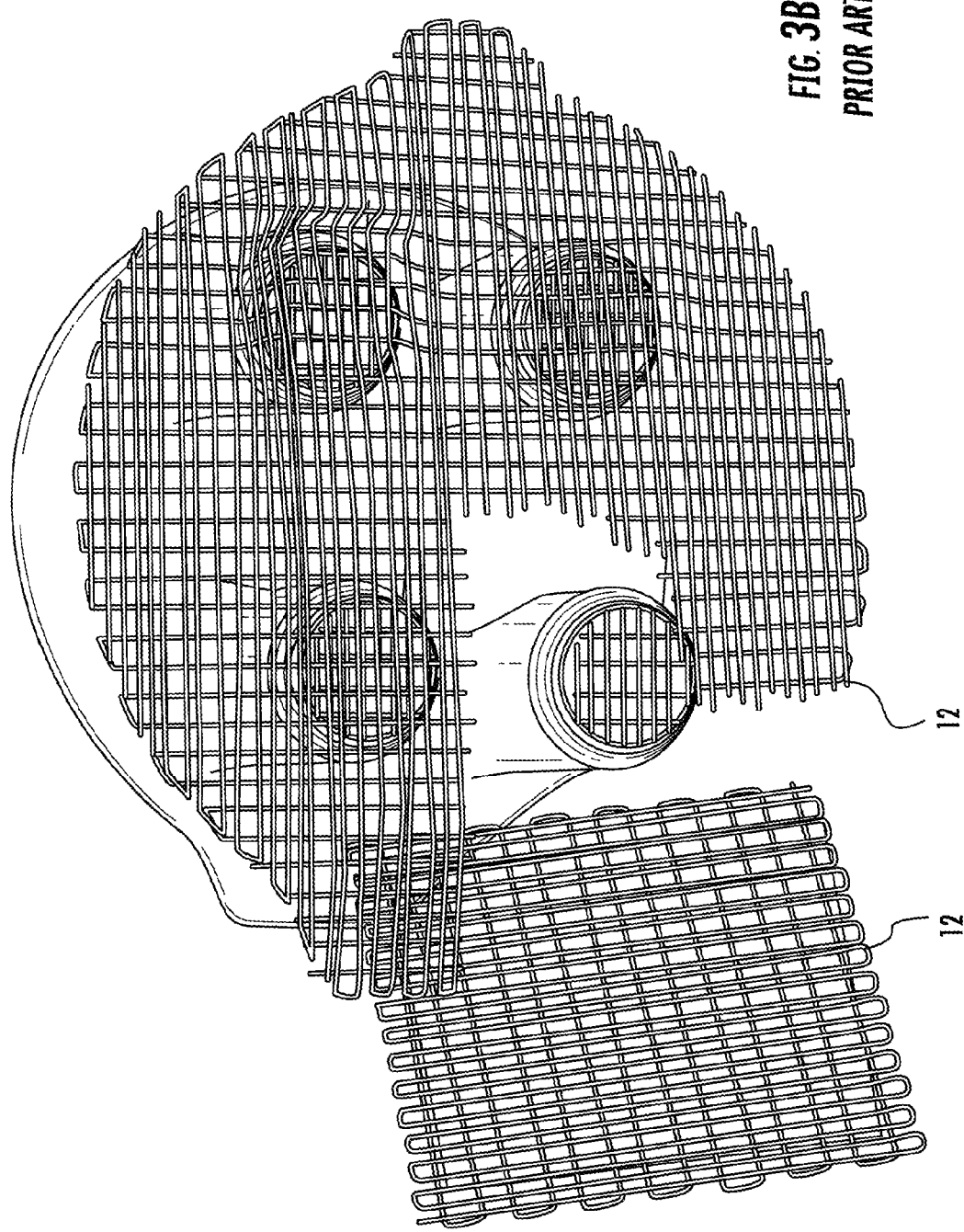
Figure 3C:
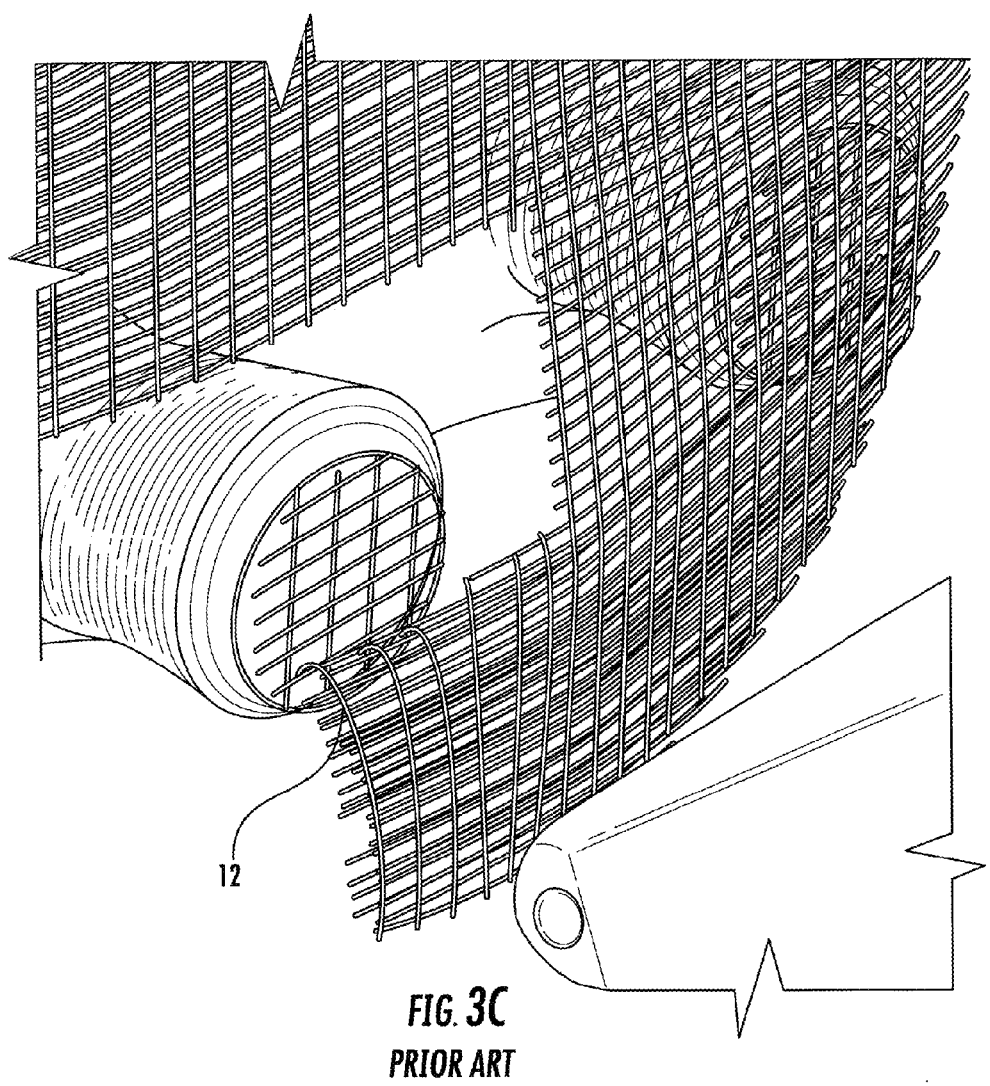
Figure 4:
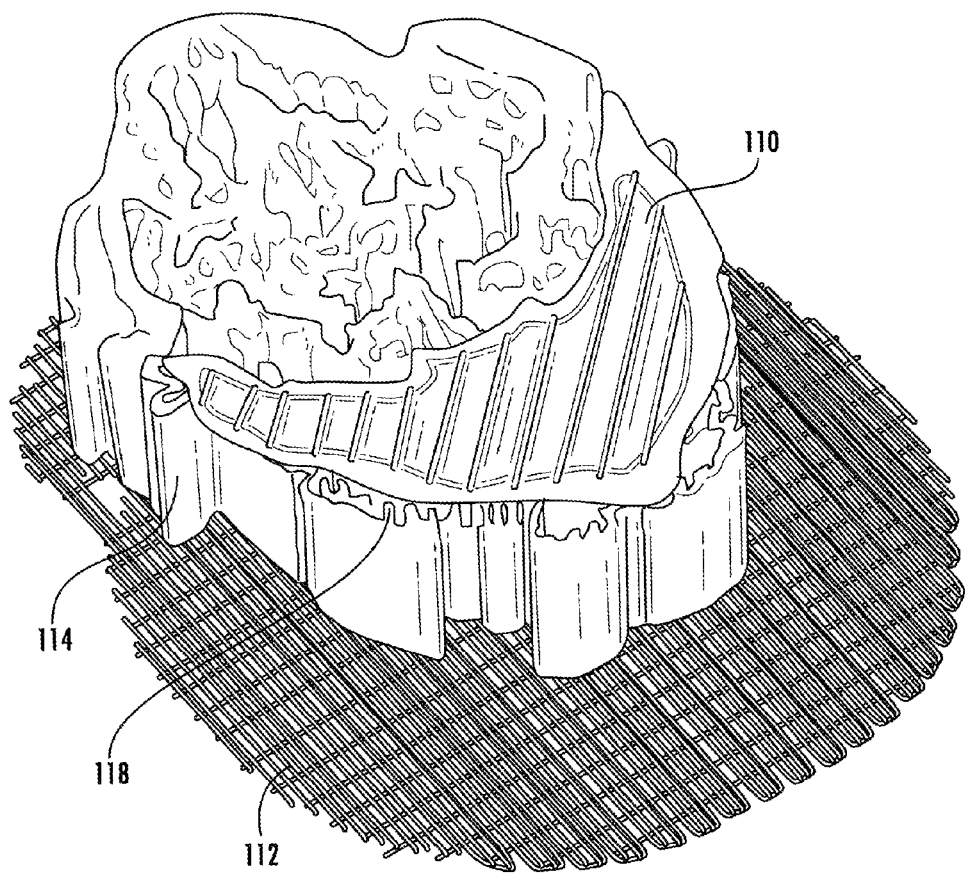
Figure 5A:
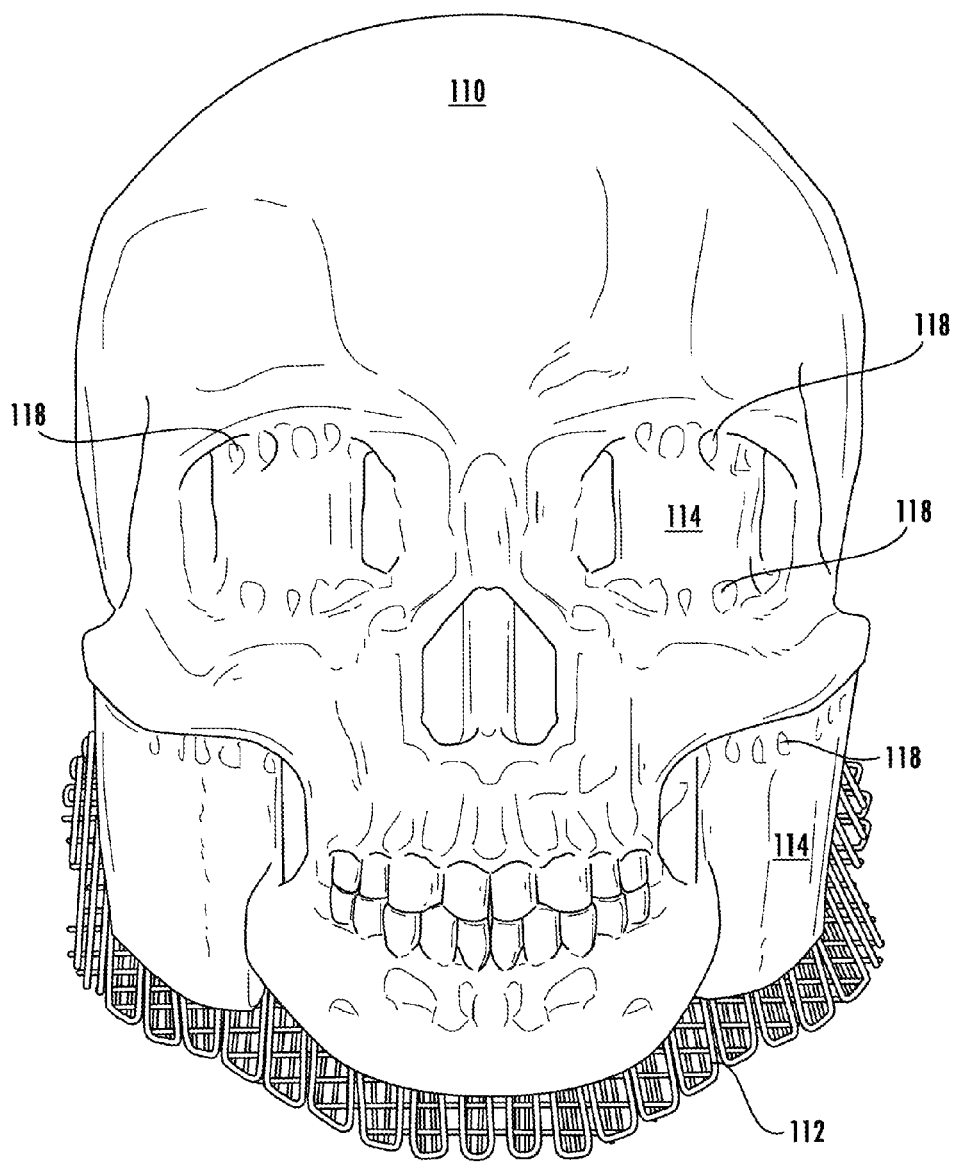
Figure 5B:
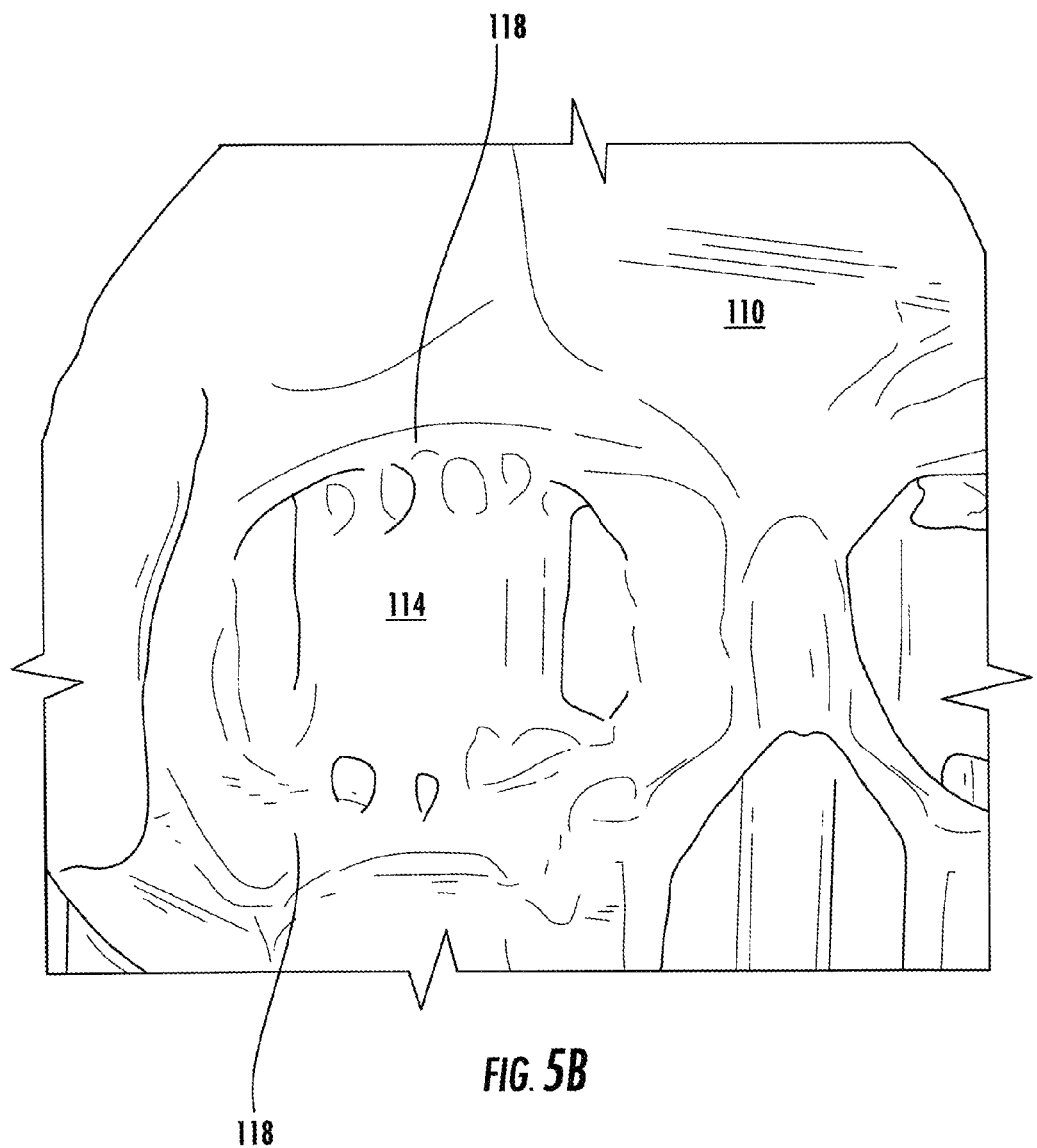
Figure 5C:
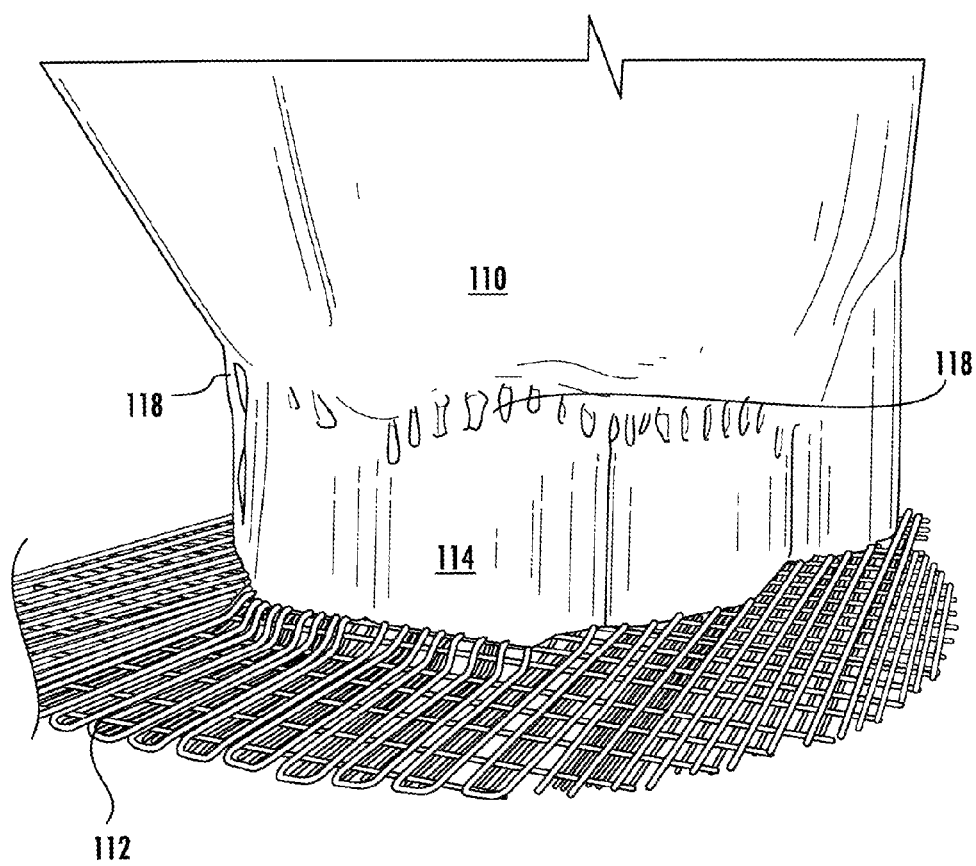
Figure 7:
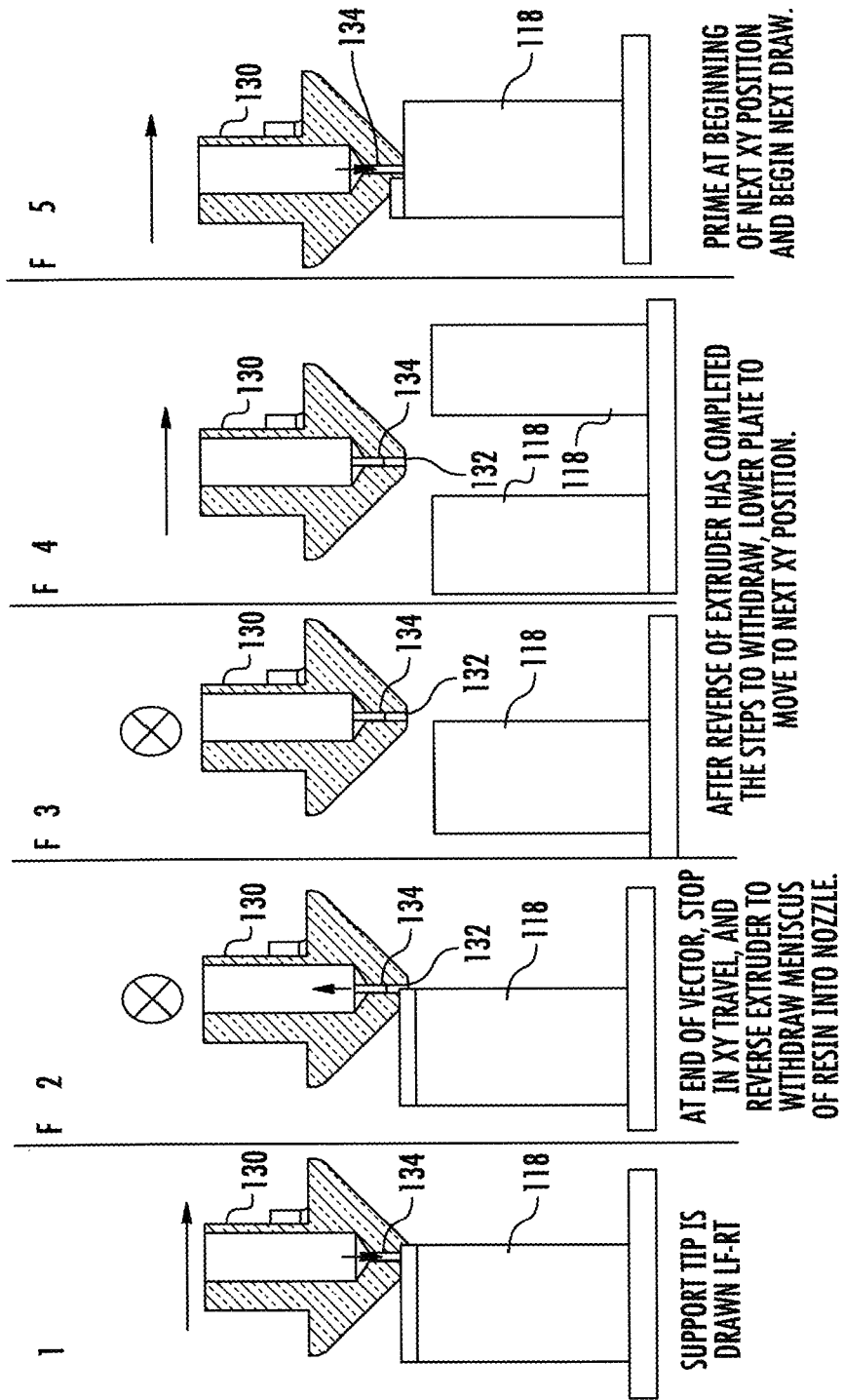
Figure 8:
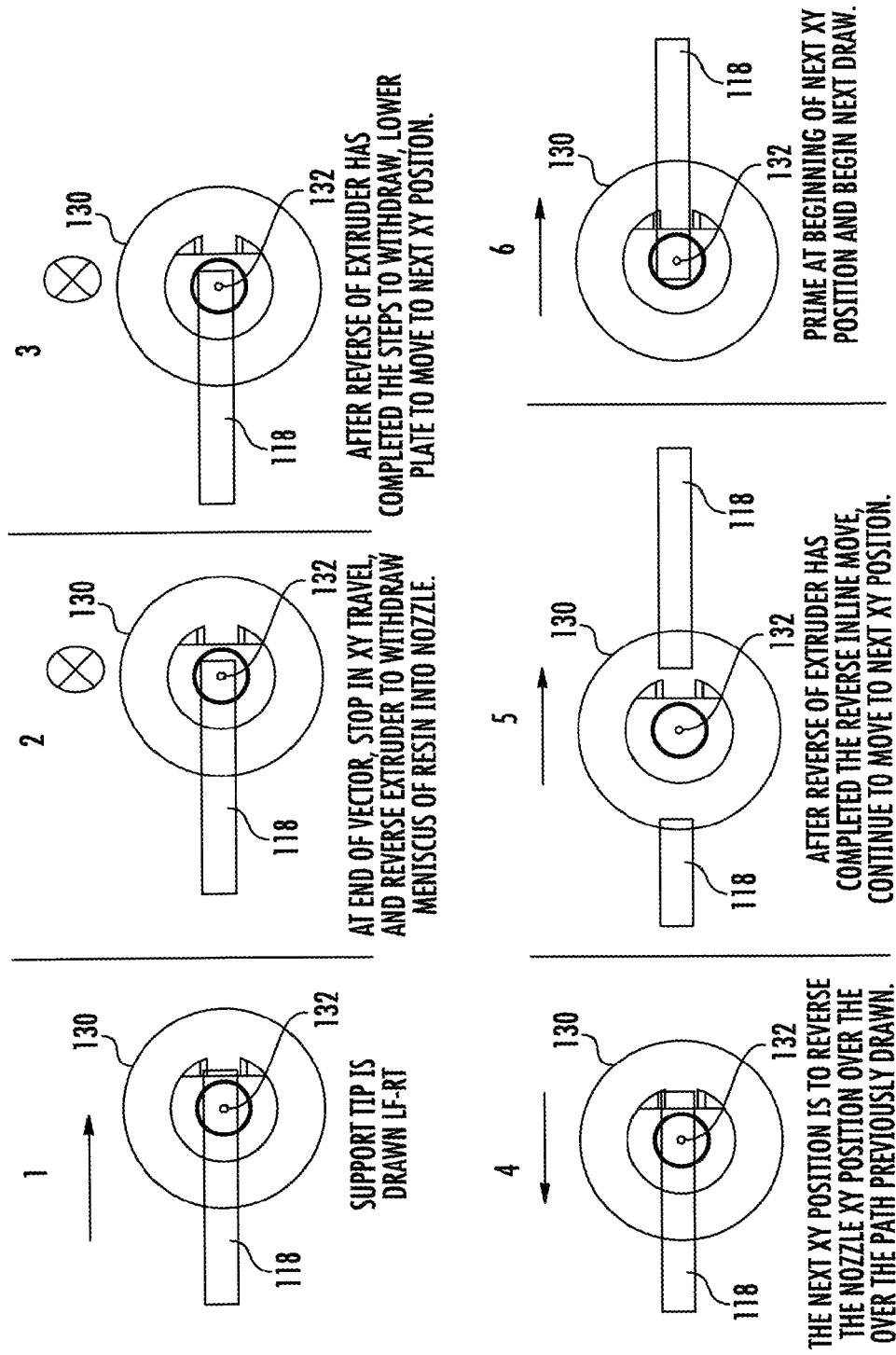
Figure 9:
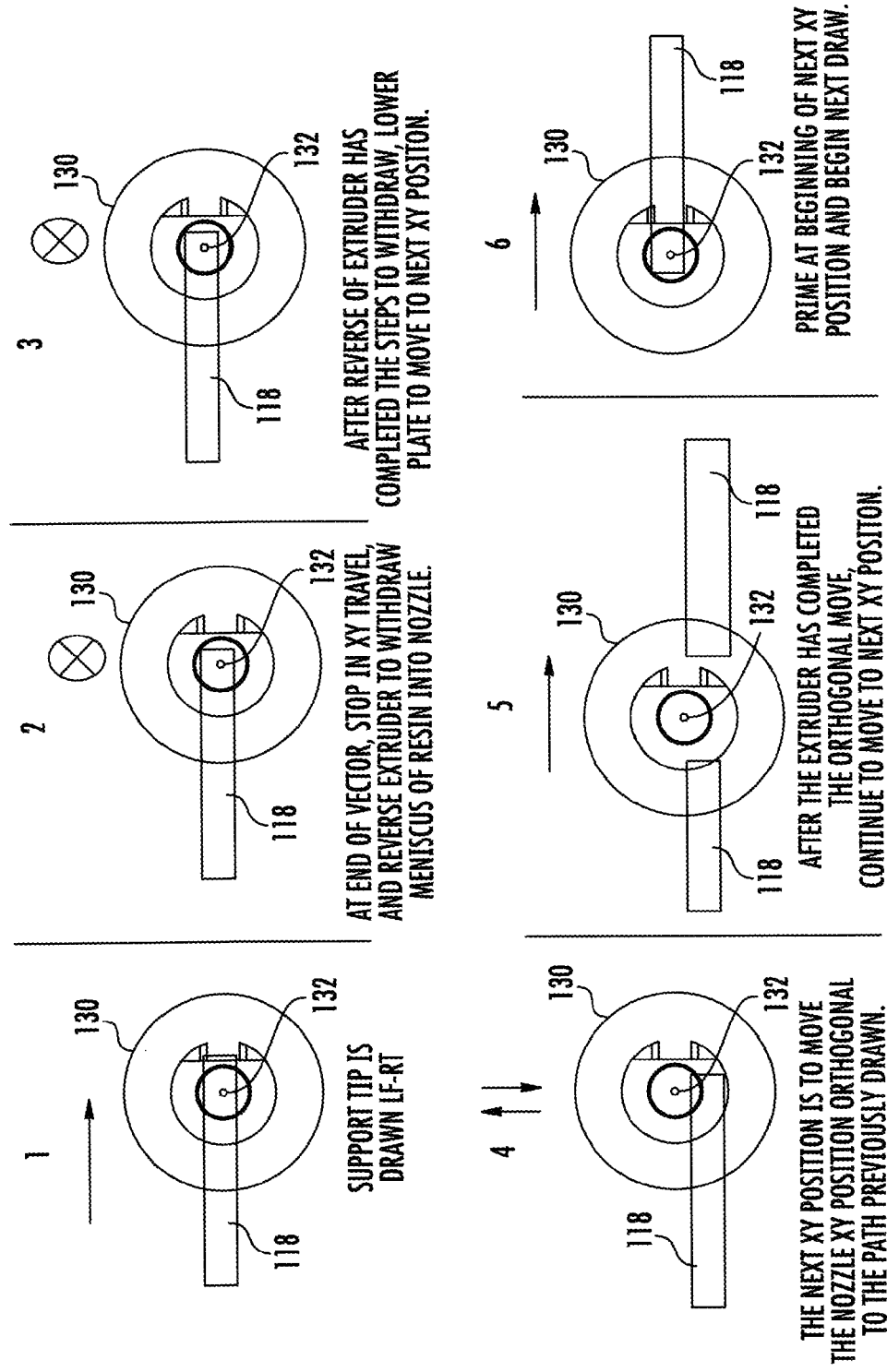
Figure 77:
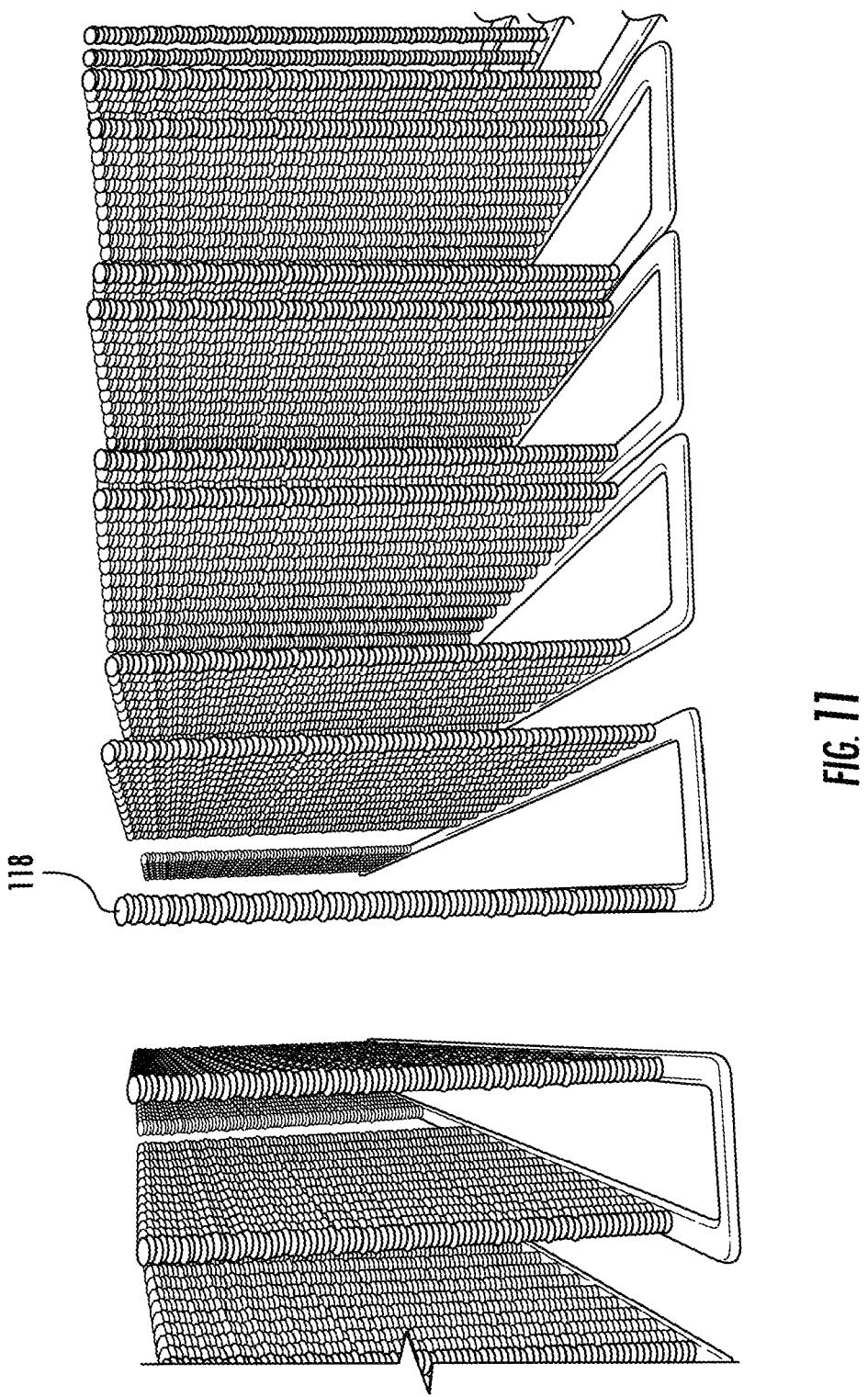

Having thus described the invention in general terms, reference will now be made to the accompanying drawings, which are not necessarily drawn to scale and are meant to be illustrative and not limiting, and wherein:

FIG. 1 is a front perspective view of a 3D object (airplane) printed with a support structure, including a raft as a lower portion of the support structure, made by prior art techniques (without fine points), which illustrates the difficulty of removing support structures from the 3D object (the remaining portion of support structure under the right side of the propeller);

FIGS. 2A-2D are side perspective views of a 3D object (fish) printed with a support structure with a raft, made by prior art techniques (without fine points) that provide troughs that support the 3D object, wherein within the troughs the 3D object is supported by continuous beads of material as opposed to the fine points of the present invention;

FIGS. 3A-3C are perspective view of two 3D objects (pyramidal structure and a pig) illustrating the prior art technique of providing a raft, without other support structure, between the print pad and the 3D object, wherein FIGS. 3B and 3C illustrate the difficulty in removing bead type interfaces between the 3D object and the support structure;

FIG. 4 is a perspective view of one embodiment of the present invention illustrating a 3D object (skull) partially built and supported by a support structure with fine points printed for supporting subsequent layers of the 3D object;

FIGS. 5A-5C are perspective views of another embodiment of the present invention illustrating a 3D object (skull) showing the support structures with fine points supporting the 3D object;

FIGS. 6A-6H are perspective view of another embodiment of the present invention illustrating the removal of the support structure from the 3D object (skull) showing various techniques to remove the support structure by hand, with tools, and/or with sandpaper to remove the remnants of fine points;

FIG. 7 is a side view of a schematic illustrating the technique for making fine points in accordance with one embodiment of the present invention, wherein the dispenser dispenses the print material (step 1), retracts the print material from the exit of the dispenser (step 2 stating that the extruder is reversed to withdraw meniscus of resin into nozzle), moves vertically relative to the fine point (step 3), moves horizontally toward the next fine point (step 4), move vertically to the next fine point and resume dispensing of print material (step 5);

FIG. 8 is a top view of a schematic illustrating the technique for making fine points in accordance with another embodiment of the present invention, wherein the dispenser dispenses the print material (step 1), retracts the print material from the exit of the dispenser (step 2 stating that the extruder is reversed to withdraw meniscus of resin into nozzle), moves vertically relative to the fine point (step 3), moves horizontally away from the next fine point (step 4), moves horizontally toward the next fine point (step 5), move vertically to the next fine point and resume dispensing of print material (step 6);

FIG. 9 is a top view of a schematic illustrating the technique for making fine points in accordance with another embodiment of the present invention, wherein the dispenser dispenses the print material (step 1), retracts the print material from the exit of the dispenser (step 2 stating that the extruder is reversed to withdraw meniscus of resin into nozzle), moves vertically relative to the fine point (step 3), moves horizontally from the next fine point in an orthogonal direction relative to a direction to the next fine point (step 4), moves horizontally toward the next fine point (step 5), move vertically to the next fine point and resume dispensing of print material (step 6);

FIGS. 10A and 10B are side enlarged view of multiple layers of fine points made without retracting the print material from the dispenser (FIG. 10A) and made with retracting the print material from the dispenser (FIG. 10B), which illustrates the more accurate fine points of FIG. 10B provided by retracting the print material from the dispenser prior to moving from a first fine point to a second fine point;

FIG. 11 is a side perspective view of arrays of fine points printed to demonstrate how tall the fine points of the present invention can be made, wherein the upper layers of certain fine points is of a diminished quality because of the decrease in stability based upon the heights of the fine points; and FIG. 12 is a top perspective view of the arrays of fine points of FIG. 11.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although apparatus and methods for supporting 3D objects during printing are described and shown in the accompanying drawings with regard to specific types of 3D printing techniques, it is envisioned that the functionality of the various apparatus and methods may be applied to any now known or hereafter devised 3D printing technique. Like numbers refer to like elements throughout.

With reference to FIGS. 4 to 14, support structures and print techniques for use with 3D printing techniques in accordance with various embodiments of the present invention are illustrated. Although described in the present application as being used together, each of the support structure embodiments may be used alone according to the 3D printing technique used, the print material(s) used, and the geometry of the 3D object to be printed.

Turning first to the prior art of FIGS. 1 to 3C, conventional techniques for supporting the printed 3D object using single material dispensing systems, such as fused deposition modeling using a single filament of material, such as polylactic acid (PLA) or acrylonitrile butadiene styrene (ABS) and other polymers, typically provide beads of material upon which the down-facing surfaces of the 3D object are printed. FIG. 1 illustrates a 3D object 10 having a raft 12 and support structure 14, wherein the upper portion of the support structure comprises beads (also sometimes called roads) of materials at the interface between the 3D object and the support structure. A portion of the support structure below the right side of the propeller 16 has been removed, but an upper portion 18 of the support structure 14 remains connected to the propeller. The upper portion 18 is very difficult to remove from the 3D object 10 without damaging or breaking the features of the 3D object.

FIGS. 2A to 2D illustrate another 3D object 10 supported by a raft 12 and support structure 14 in accordance with another prior art technique for supporting printed 3D objects. The upper portion 18 of the support structure defines a trough within which the down-facing surfaces of the 3D object 10 are supported along parallel beads of print material. Although the upper portion 18 of FIGS. 2A to 2D are generally easier to separate as compared to the upper portion 18 of FIG. 1, because the trough causes the upper portion to stay together during separation to minimize the amount of support material that adheres to the 3D object, such supports can cause portions of the 3D object to break off with the upper portion of the support structure.

FIGS. 3A to 3C show yet another prior art embodiment that includes only a raft 12 for supporting the 3D object 10. The raft of the 3D object on the right side has been partially removed, and as shown in FIGS. 3B and 3C, the beads defining the upper surface of the raft are difficult to remove from the down-facing surfaces of the 3D object. For some applications, it may be acceptable to leave beads of support material on the bottom surfaces of the 3D object; however, it is generally preferred that the surfaces which contact the support structure during a print process have a similar surface quality as the other exterior surfaces of the 3D object.

FIG. 4 illustrates one embodiment of the present invention in which a partially printed 3D object 110 is shown along with support structures 114 that include a raft 112 (alternative embodiments of the present invention include support structures without a raft, such that the support structure, or even the fine points, directly contact the print pad (with or without adhesive applied to the print pad)) and fine points 118 that are provided to support future layers of the 3D object yet to be printed. The fine points are typically 0.5 mm×1.1 mm to 2.5 mm×1.25 mm in size (along the x-, y-plane; the layers are generally 0.25 mm thick along the z-axis for these embodiments) to enable them to be easily separated from the finished 3D object. The size of the fine points is typically influenced by the size of the exit of the dispenser. The exits of the dispensers (nozzles) of certain embodiments are 0.4 mm, but exit diameters can range from 0.1 mm to 2.5 mm or larger depending upon the accuracy required and time considerations for completing the print process. Some embodiments of the present invention provide fine points that are one times to three times the diameter of the exit of the dispenser. FIGS. 5A to 5B illustrate a completed 3D object 110 with support structures 114 and fine points 118 under the 3D object and within openings of the 3D object that are not self-supporting. It should be noted that fine points 118 can be used not only on down-facing surfaces of the 3D object 110 but also on up-facing surfaces upon which additional support structures may be required. In some embodiments of the present invention, the dispenser jumps between fine points for two or more layers prior to printing of a down-facing surface of the 3D object above the fine points, which enables the 3D object to be easily separated from the support structures once the print process is complete.

Figure 6A:
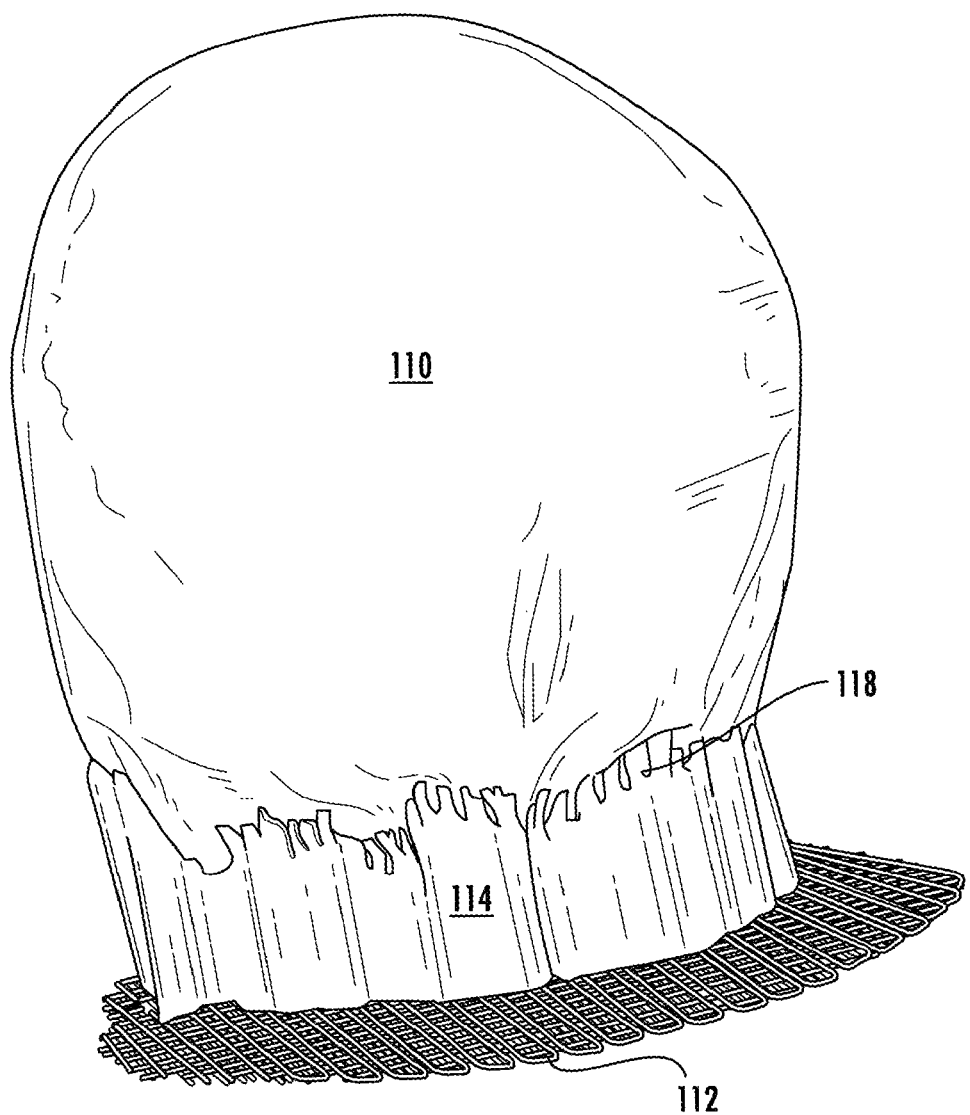
Figure 6B:
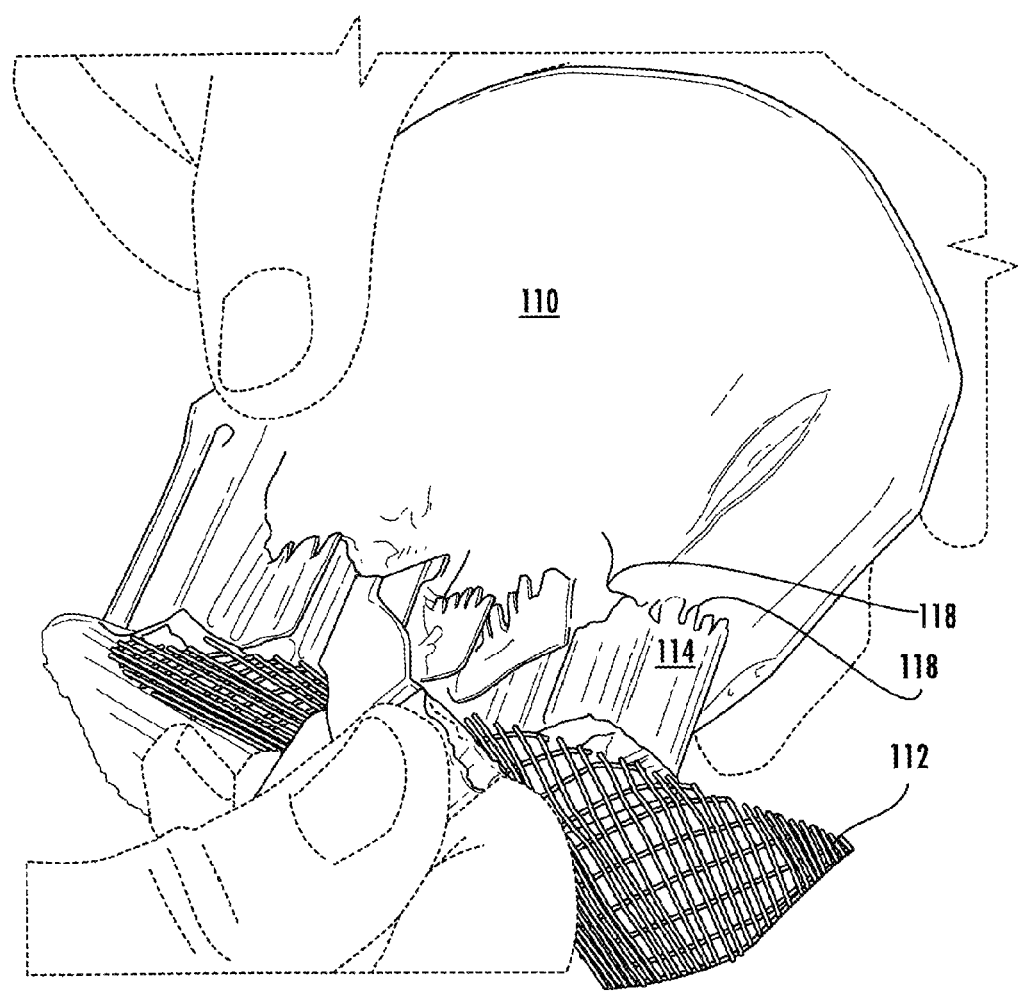
Figure 6C:
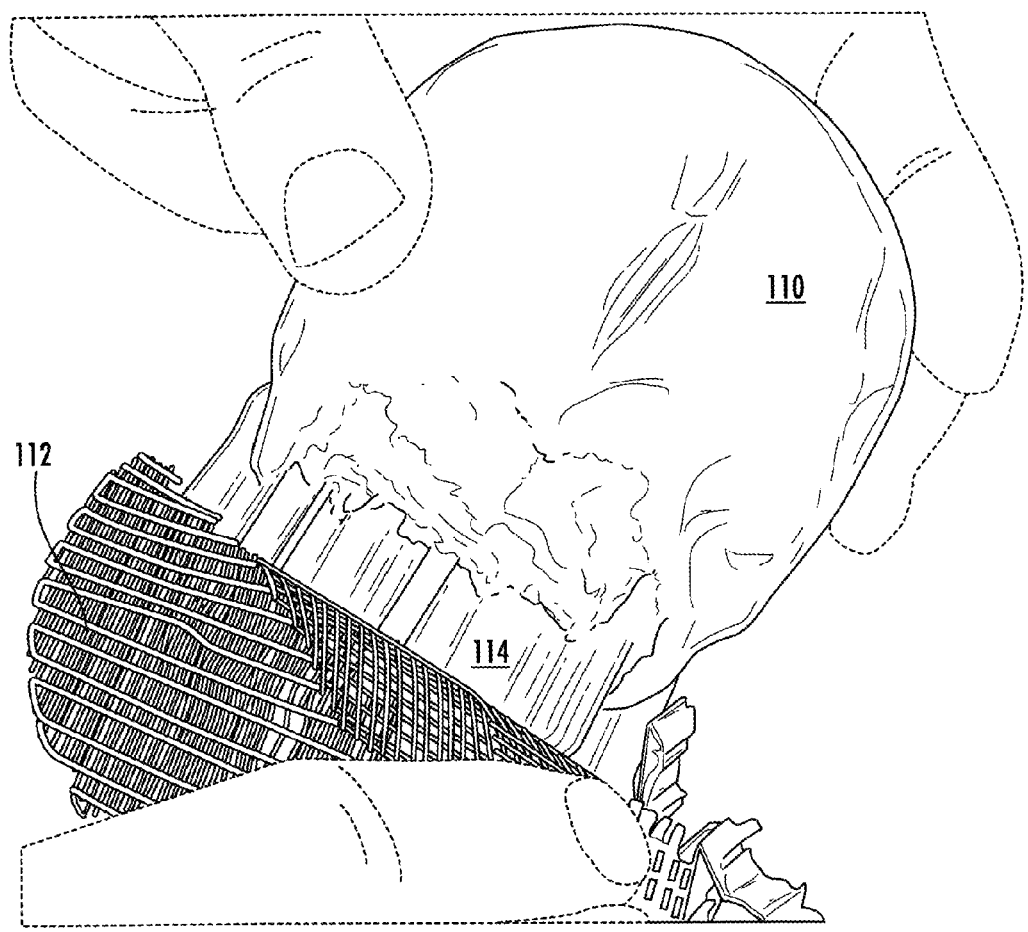
Figure 6D:
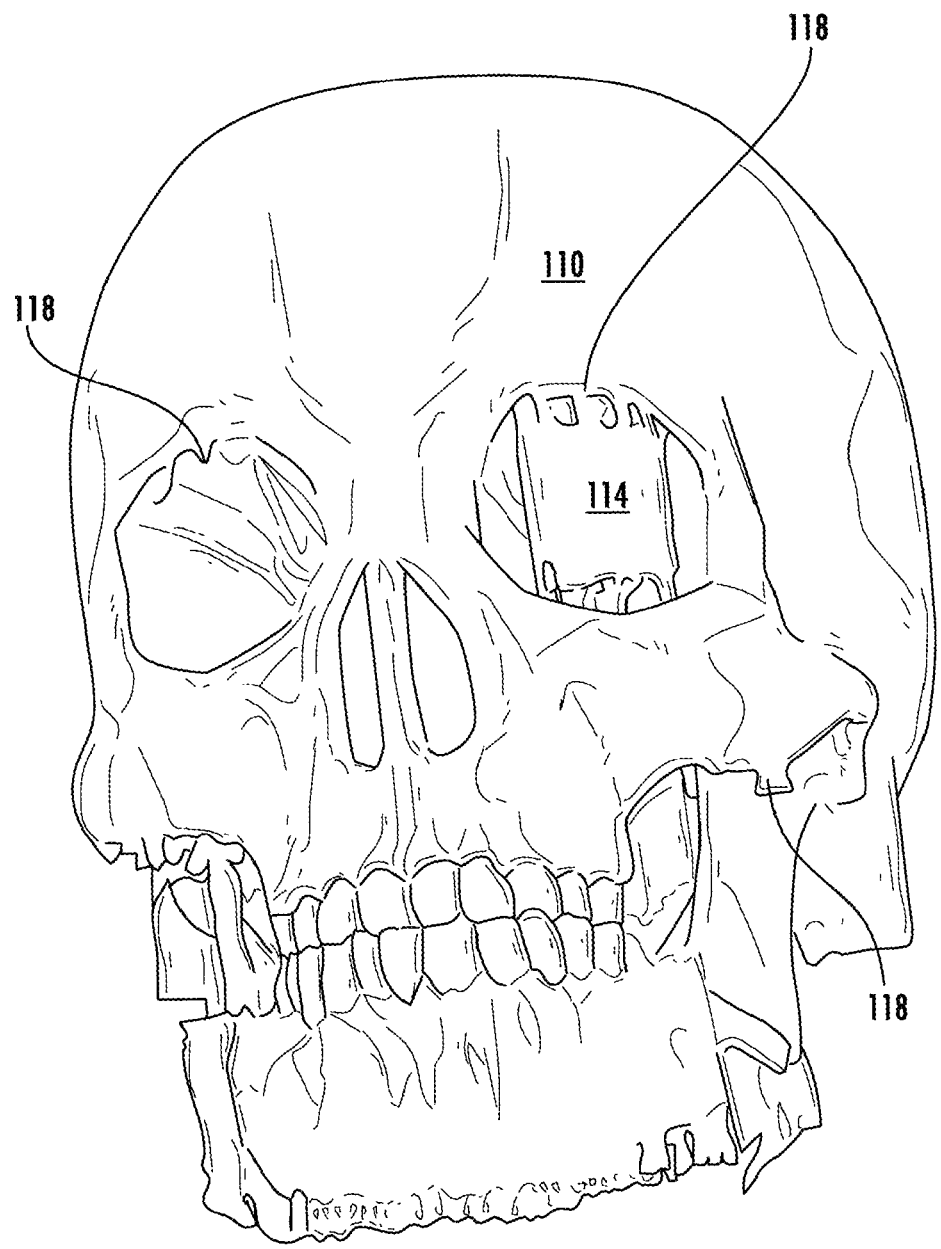
Figure 6E:
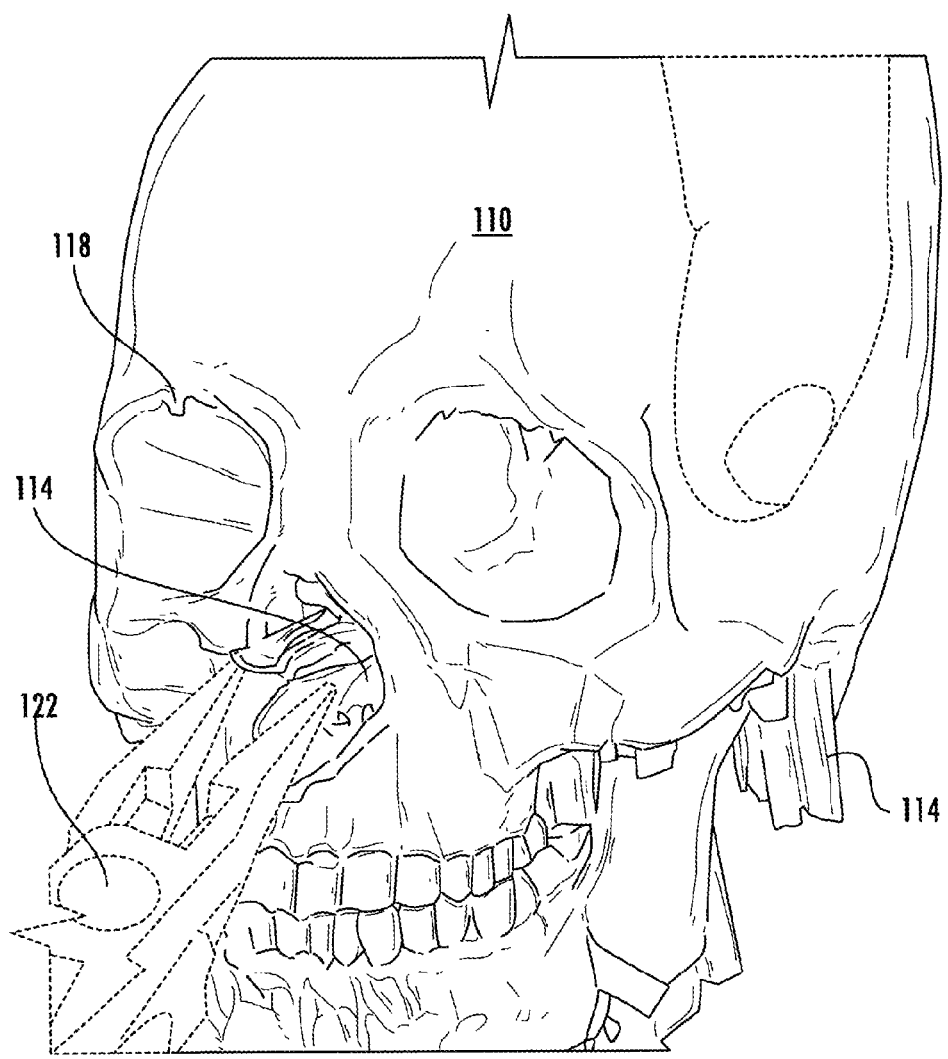
Figure 6F:
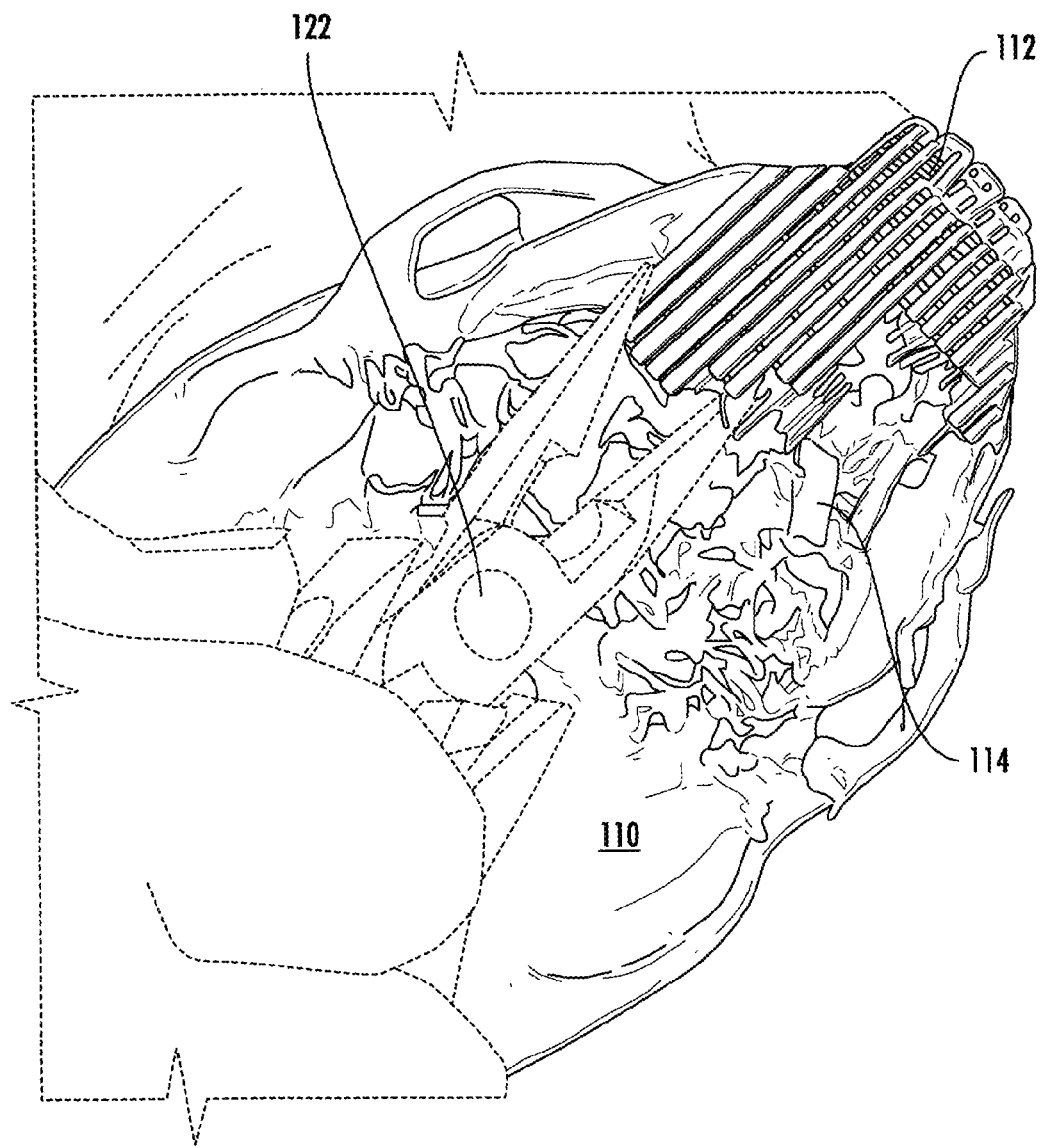
Figure 6G:
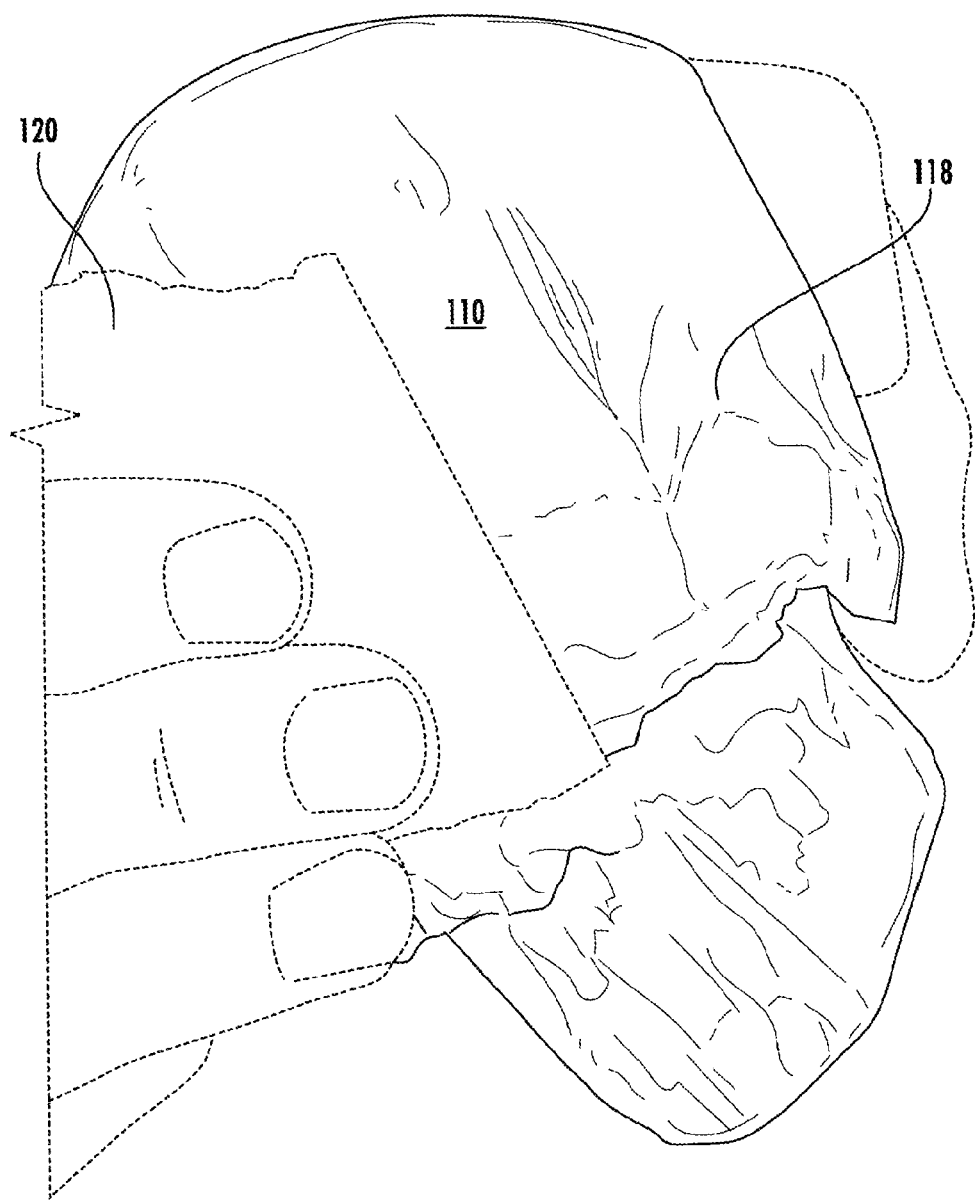
Figure 6H:
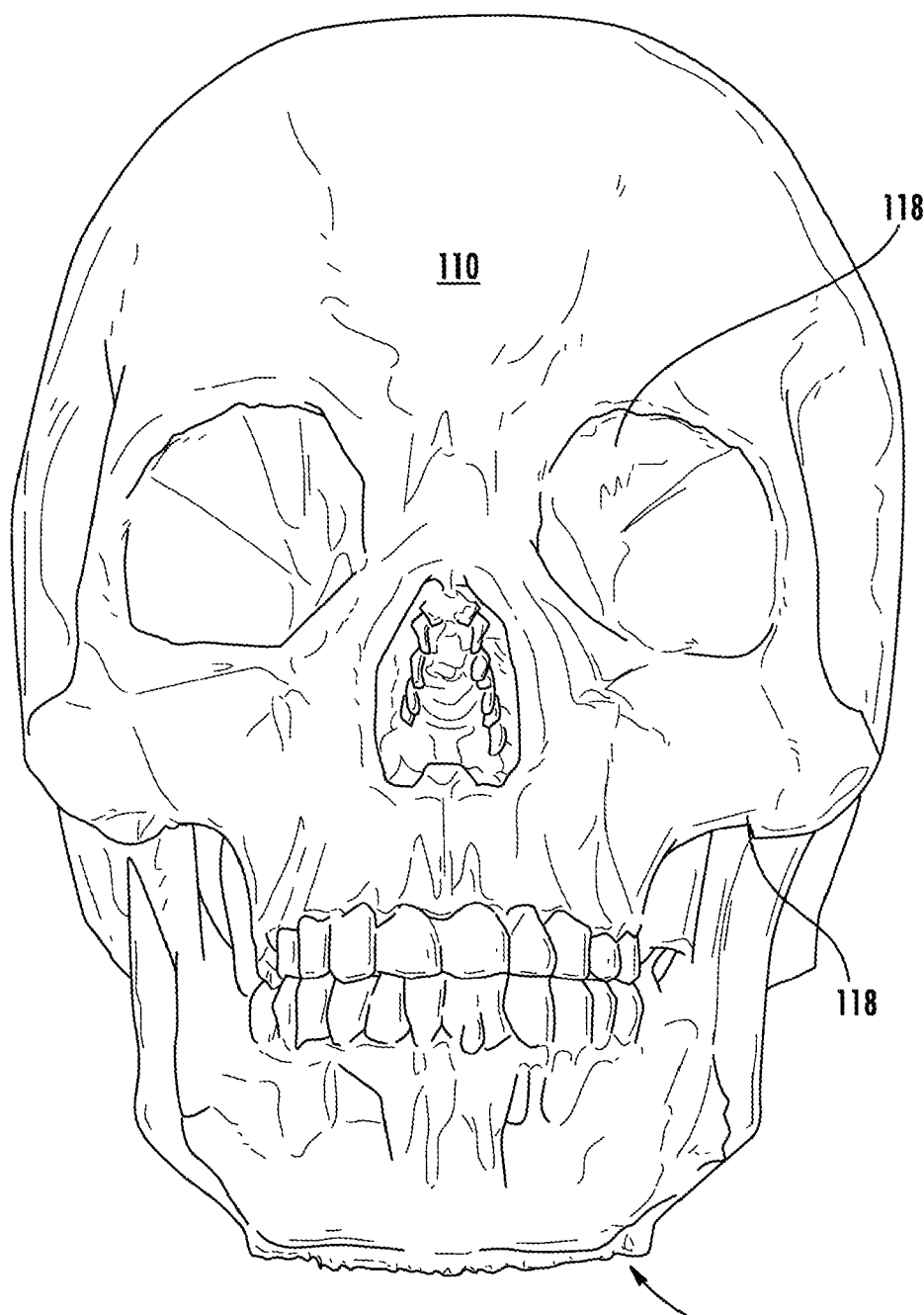

FIGS. 6A to 6H illustrate the removal of the support structures 114, including fine points 118, from a 3D object 110, FIG. 6B shows the raft 112 being folded down and the supports 114 separating from the 3D object 110. Some fine points 118 may initially remain on the 3D object 110, but they can typically be removed very easily by hand or with sandpaper, as shown in FIG. 6G. When removing support structures 114 from tight locations of the 3D object 110, hand tools 122 such as pliers, snips, or other tools may be used to help remove the support structures. FIG. 6H shows the 3D object with most of the support structure removed and a number of fine points 118 left to be removed.

FIG. 7 illustrates five steps for making the fine points in accordance with one embodiment of the present invention. Step 1 of FIG. 7 shows the dispenser 130, which may be a heated nozzle through which a filament is selectively fed to generally melt, the filament print material and dispense the print material from the exit 132 of the dispenser, dispensing (printing) material from left to right ("LF-RT") to print the fine point 118. Once the fine point 118 is printed, the dispenser retracts the print material 134 into the dispenser such that the meniscus of print material that typically extends below the exit 132 of the dispenser is withdrawn into the exit of the dispenser, as shown in step 2. The print material 134 is retracted by techniques known in the art, such as reversing the drive gear that typically advances the print material through the nozzle. As shown in step 3, the dispenser 130 is raised relative to the fine point 118, or the fine point is lowered relative to the dispenser (by lowering the print pad). In step 4 the dispenser 130 moves horizontally to the next fine point 118. In step 5 the dispenser 130 is lowered (or the print pad is raised) and the dispenser extrudes the print material to form the next fine point 118.

FIGS. 8 and 9 show two variations of the technique disclosed in FIG. 7. In particular, FIG. 8 has the additional step 4 in which before the dispenser moves horizontally toward the next fine point, the dispenser 130 makes a first motion in a direction that is different than the direction towards the next fine point. In the illustrated embodiment of FIG. 8, that direction is opposite the direction towards the next fine point. In the illustrated embodiment of FIG. 9, that direction (of step 4) is orthogonal the direction towards the next fine point. After this first motion in a different direction is complete, the dispenser then moves towards, either directly or indirectly, the next fine point. By adding this extra first motion, which does add a certain amount of time to the build process, these embodiments of the present invention cause any unintentional strings or blobs of print material to be deposited in a direction that is less likely to adversely affect the fine points specifically or the entire print process in general. Further embodiments of the present invention do not repeat the first motion but randomize the first motion so that any strings or blobs do not accumulate over multiple layers but are placed at different locations to minimize any adverse effects.

FIGS. 10A and 10B each illustrate an array of four fine points 118 that are three arrays deep (total of twelve fine points shown) that have the undesirable strings or blobs stretching from the right side to the left between the fine points. FIG. 10A shows fine points made without retracting the print material into the exit of the dispenser, and FIG. 10B shows find points made with retracting the print material into the exit of the dispenser, like the technique shown in FIGS. 7 to 9. The fine points of FIG. 10B are stronger and have better dimensional accuracy and can therefore better support the 3D object to be printed.

FIGS. 11 and 12 show additional arrays that demonstrate how tall fine points can be made with acceptable accuracy. The illustrated fine points 118 are about 15 mm tall, and as the fine points extend taller, they are increasingly cantilevered which leads to the additional strings or blobs of material that undesirably form because of movement of the fine point during the print process. Therefore, the present invention enables support structures to use varying amount of fine points to enable easier removal of support structures, as compared to thicker support structures such as columns, curtains, scaffolding, and other geometries that may be provided between the fine points and the raft, for example. The fine points can also be used to reduce the amount of print material required to support the 3D object, which enables the consumers to print more 3D objects.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

Accordingly, the present invention provides for the production of 3D objects with improved build and support materials. Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

That which is claimed:

1. A method of printing a support structure for supporting a three dimensional (3D) object during a print process, the method comprising:
    dispensing print material on a print pad to define a lower portion of the support structure;
    dispensing print material along an upper portion of the support structure to define fine points, wherein the fine points define an interface between the support structure and the 3D object to be printed; and
    jumping the dispenser between fine points to minimize or eliminate unintentional dispensing of print material between fine points, wherein jumping the dispenser comprises:
        retracting the print material from the exit of the dispenser after a first fine point has been printed;
        moving the dispenser and the print pad relative to one another to increase a distance between the dispenser and the first fine point in a vertical direction;
        moving the dispenser horizontally to the location of a second fine point;
        moving the dispenser and the print pad relative to one another to decrease a distance between the dispenser and the location of the second fine point in the vertical direction; and
        dispensing print material to print the second fine point.

2. A method according to claim 1, wherein moving the dispenser and the print pad relative to one another to increase a distance between the dispenser and the first fine point begins after the print material has been retracted from the exit of the dispenser.

3. A method according to claim 1, wherein moving the dispenser and the print pad relative to one another to increase a distance between the dispenser and the first fine point in a vertical direction comprises keeping the dispenser vertically stationary and moving the print pad relative to the dispenser.

4. A method according to claim 1, wherein moving the dispenser and the print pad relative to one another to increase a distance between the dispenser and the first fine point in a vertical direction comprises keeping the print pad vertically stationary and moving the dispenser relative to the print pad.

5. A method according to claim 1, wherein the fine points define a diameter that is one times to three times the diameter of the exit of the dispenser.

6. A method according to claim 1, wherein moving the dispenser horizontally defines a jump distance of 1 mm to 5 mm.

7. A method according to claim 1, wherein moving the dispenser horizontally defines a jump distance of 2 mm.

8. A method according to claim 1, wherein the fine point defines an average diameter of 1 mm or less.

9. A method according to claim 1, wherein the fine point is between 0.4 mm and 1.0 mm long in the direction of horizontal travel of the dispenser and between 1.0 and 2.0 mm wide in a direction orthogonal to the direction of horizontal travel of the dispenser.

10. A method according to claim 1, wherein the fine point is 0.5 mm long in the direction of horizontal travel of the dispenser and 1.2 mm wide in a direction orthogonal to the direction of horizontal travel of the dispenser.

11. A method according to claim 1, wherein the support structure is printed from the same material that the 3D object is printed.

12. A method according to claim 1, wherein the lower portion of the support structure is a raft.

13. A method according to claim 1, wherein the support structure comprises at least one of columns, curtains, and scaffolding between the lower portion and the upper portion of the support structure.

14. A method according to claim 1, wherein jumping the dispenser between fine points is repeated for two or more layers prior to printing of a down-facing surface of the 3D object above the fine points.

15. A method according to claim 1, wherein moving the dispenser horizontally toward the location of the second fine point comprises a first motion in a direction away from the location of the second fine point.

16. A method according to claim 15, wherein the first motion is in a direction orthogonal to a straight line between the first fine point and the second fine point.

17. A method according to claim 15, wherein the first motion is in a direction opposite a straight line between the first fine point and the second fine point.

18. A method according to claim 15, wherein the first motion is in a random direction relative to a straight line between the first fine point and the second fine point.

19. A method according to claim 1, wherein the dispenser comprises a heated nozzle and the print material is supplied to the heated nozzle in a solid state and is dispensed from the heated nozzle in a generally liquid state.

20. A method according to claim 19, wherein the print material is a filament.

* * * * *